Jan. 19, 1926.  
N. H. SUREN  
TRANSMITTER  
Filed Nov. 15, 1919    10 Sheets-Sheet 1
1,570,596
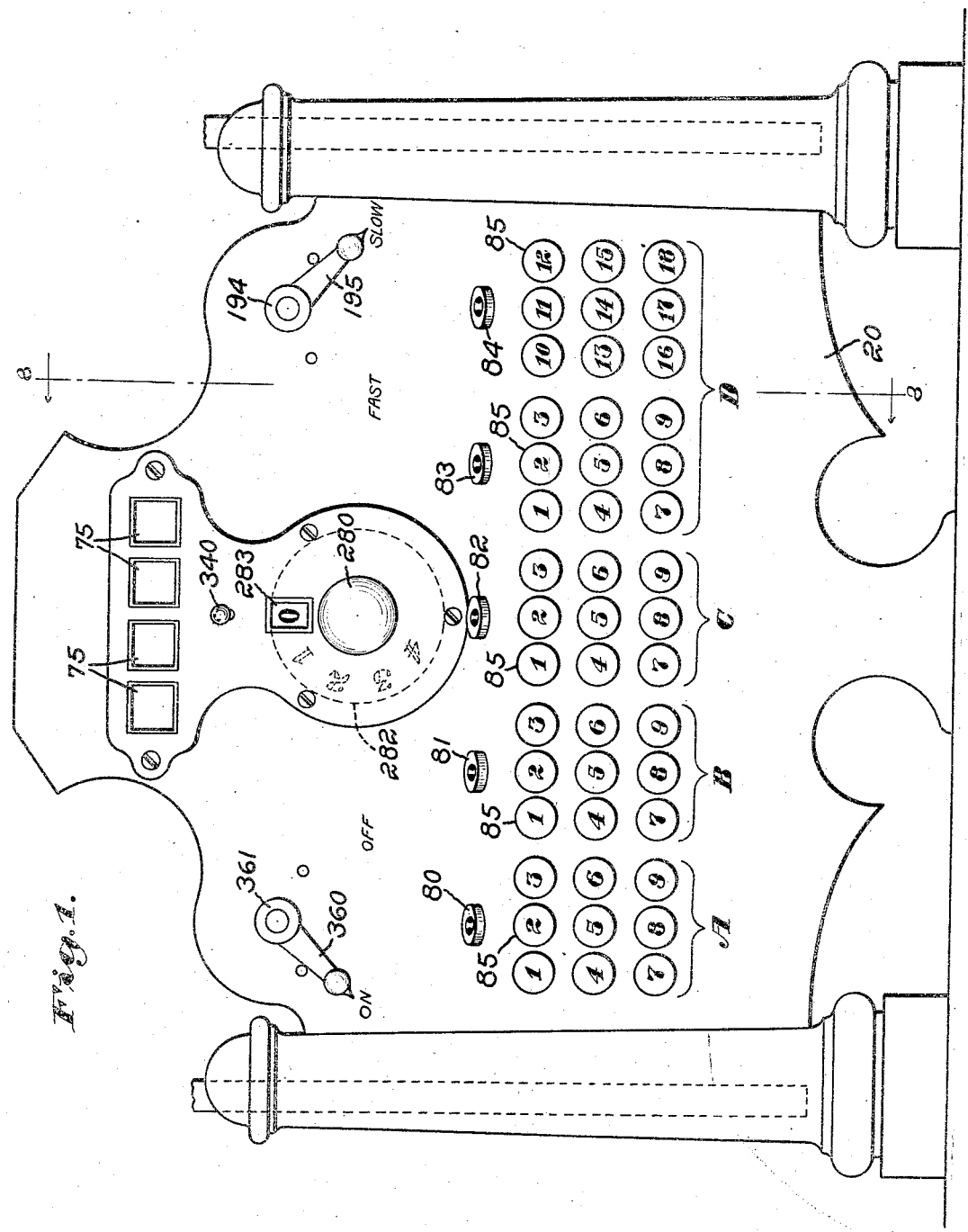

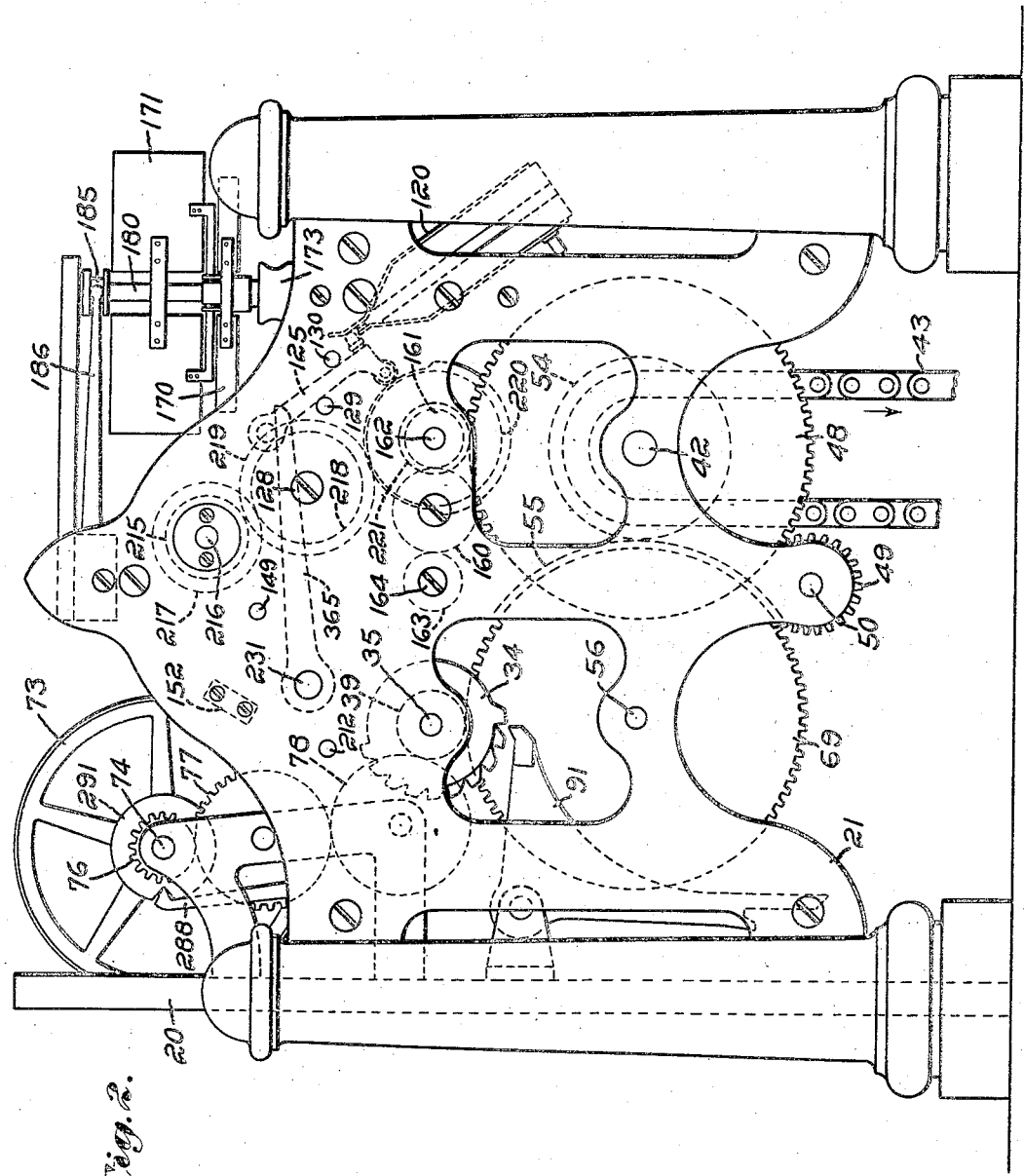

Jan. 19, 1926. 1,570,596
N. H. SUREN
TRANSMITTER
Filed Nov. 15, 1919 10 Sheets-Sheet 3
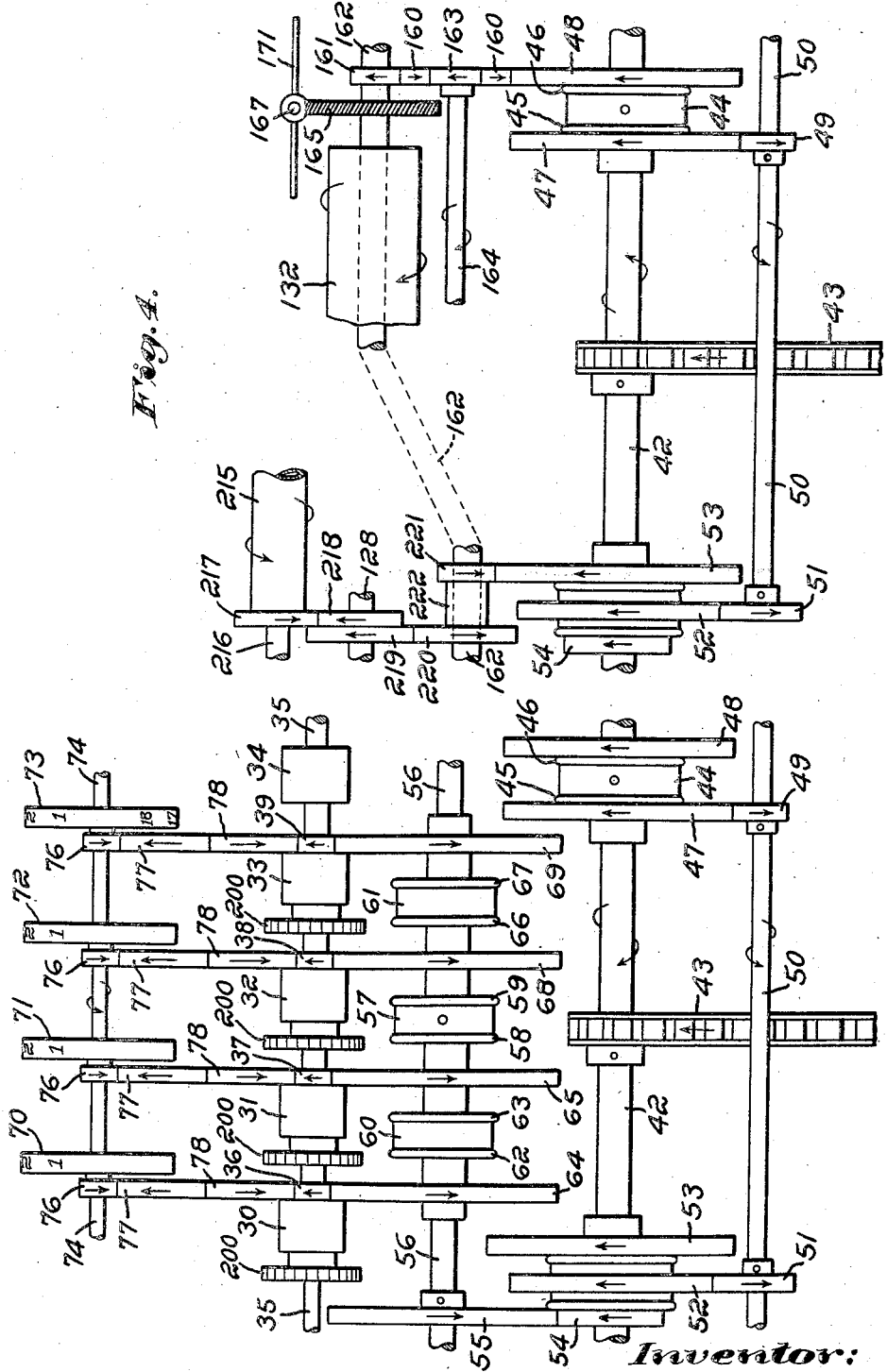

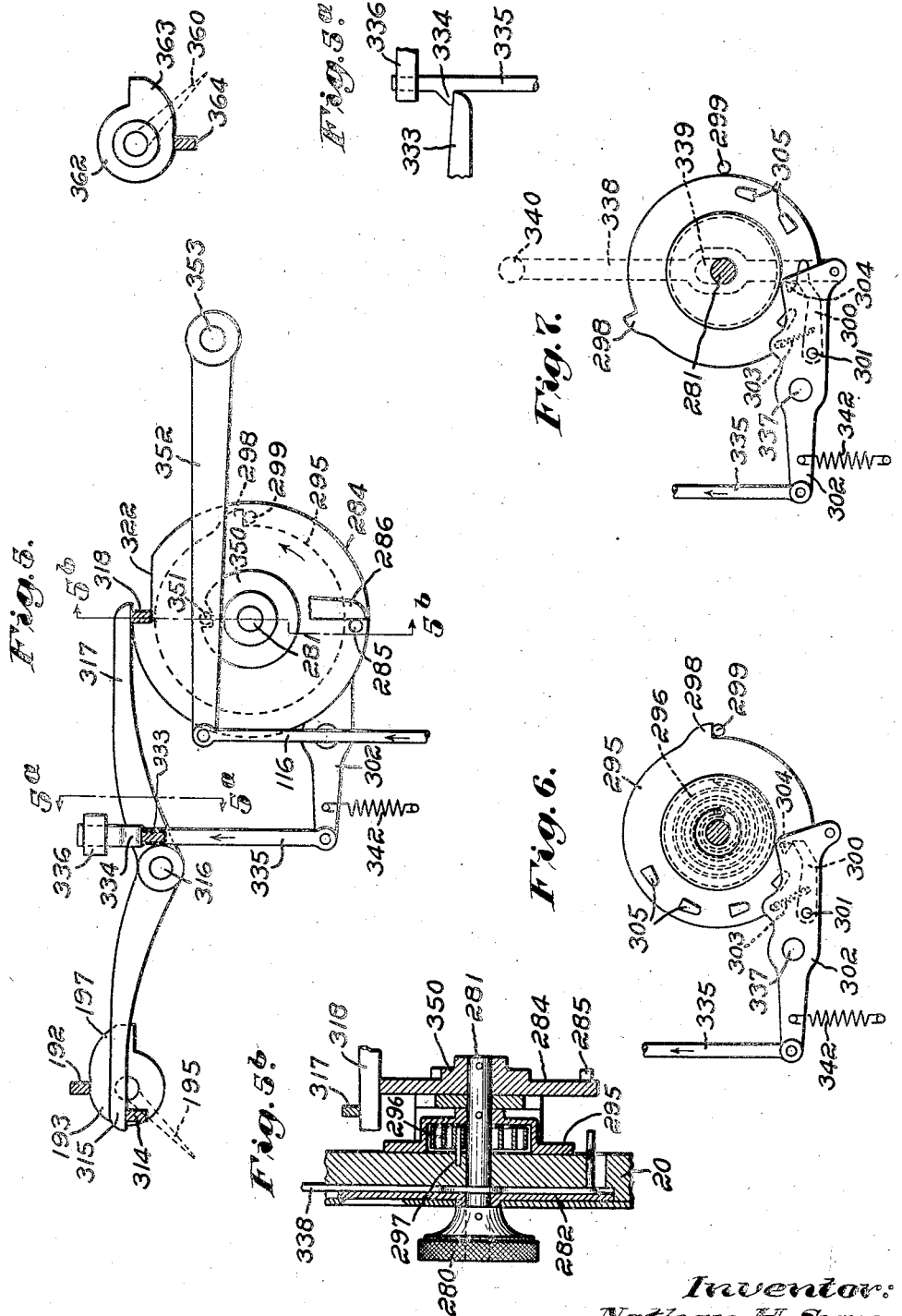

Jan. 19, 1926.  1,570,596
N. H. SUREN
TRANSMITTER
Filed Nov. 15, 1919  10 Sheets-Sheet 5

Inventor:
Nathan H. Suren,
by Emery Booth Janney & Varney
Att'ys.

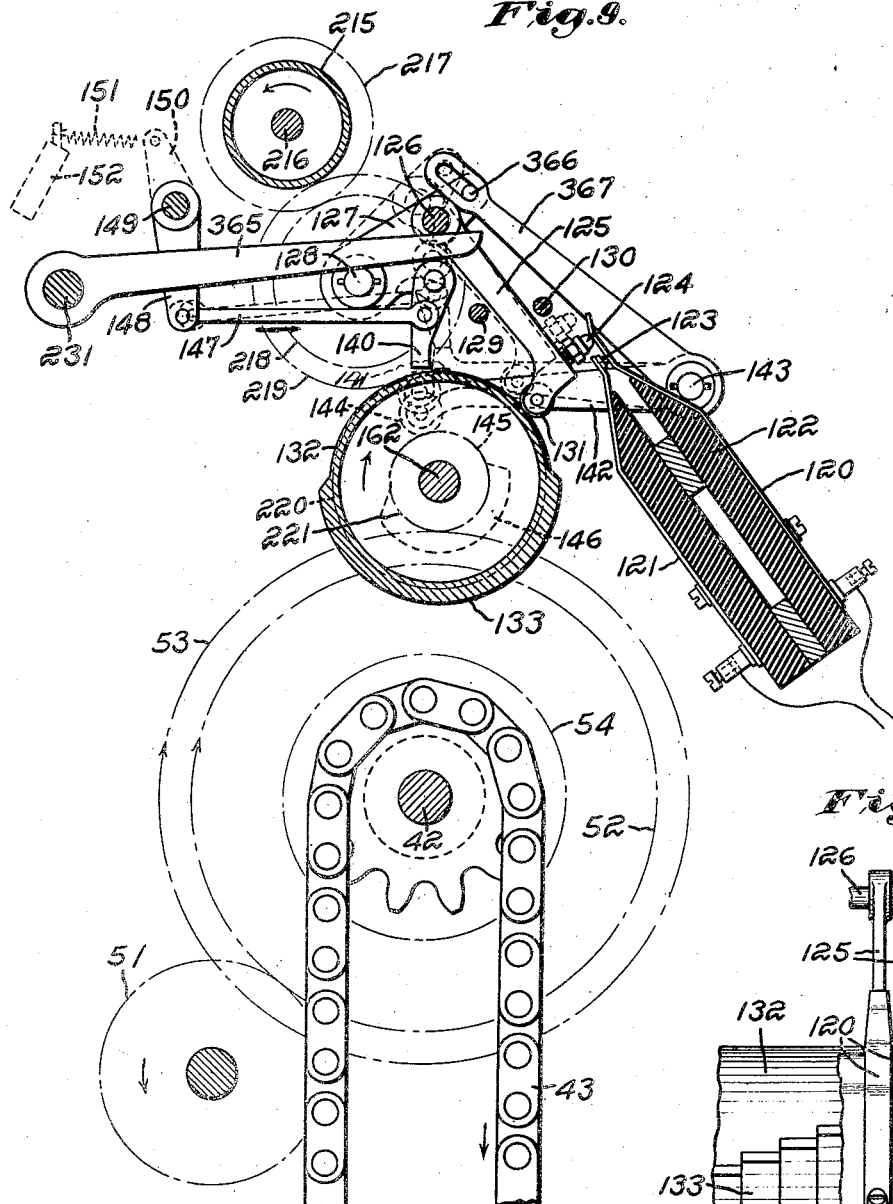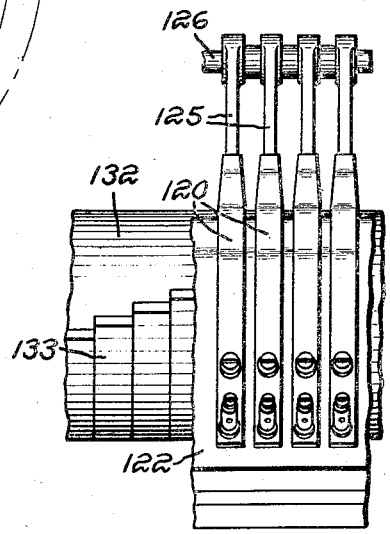

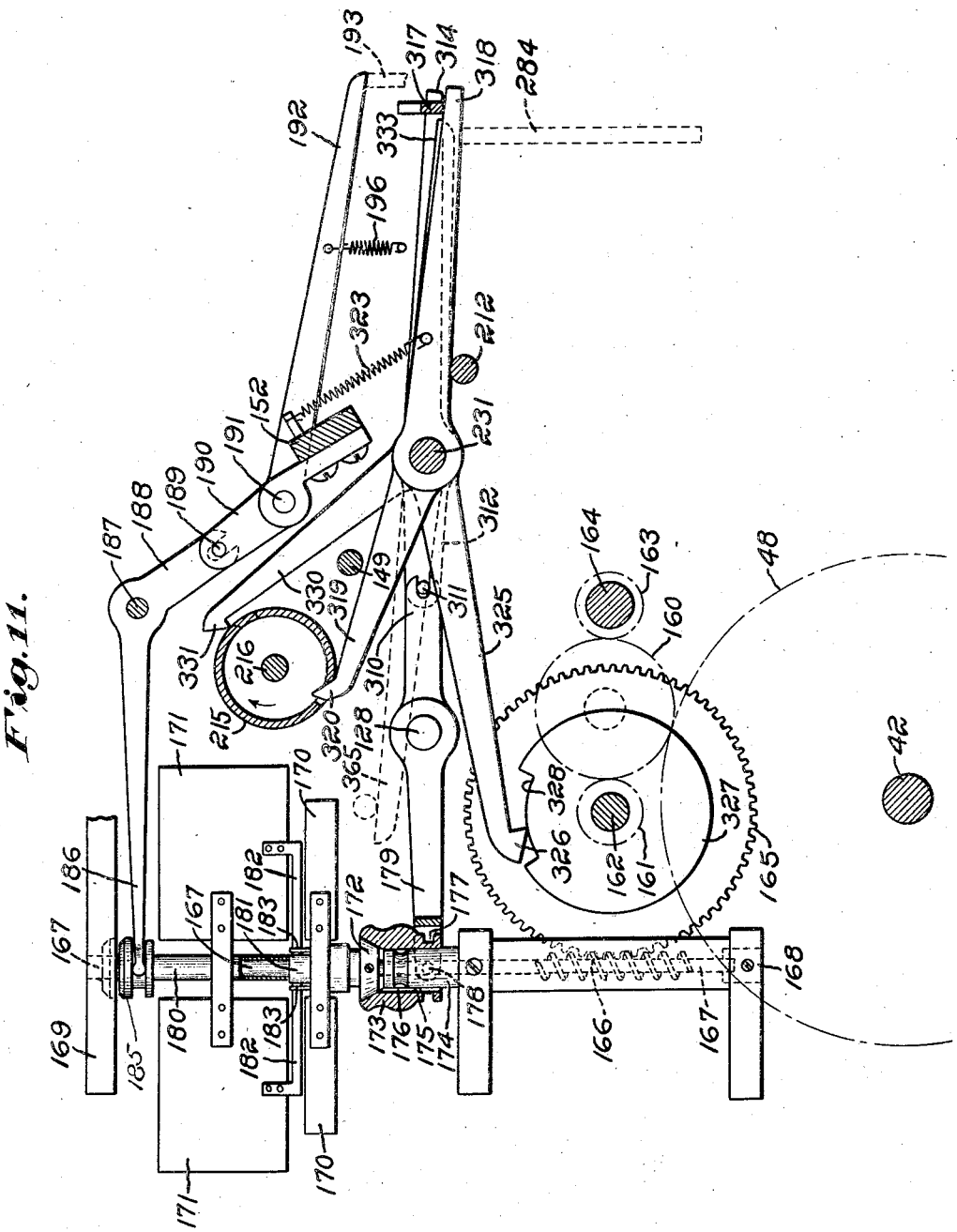

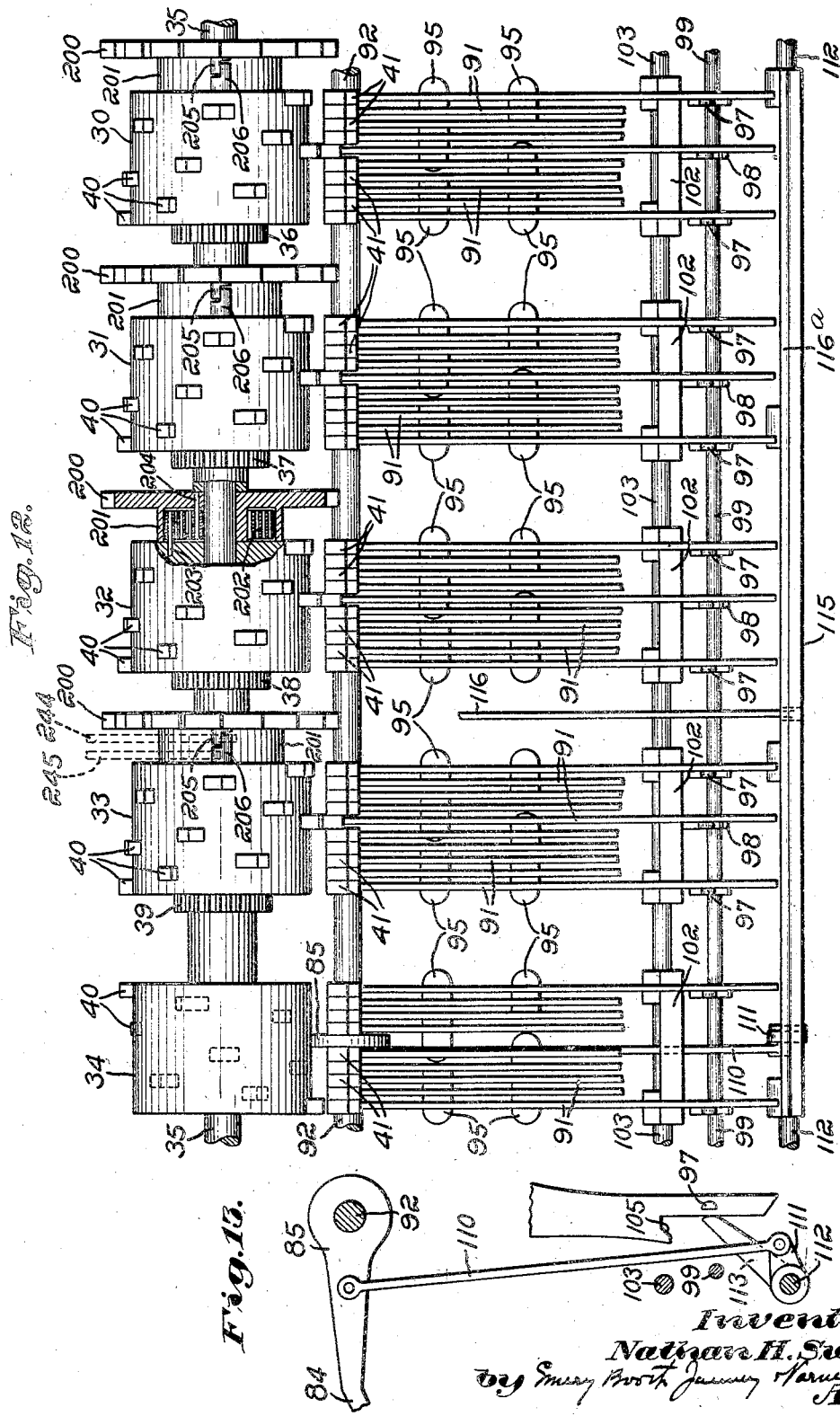

Jan. 19, 1926. 1,570,596
N. H. SUREN
TRANSMITTER
Filed Nov. 15, 1919 10 Sheets-Sheet 9
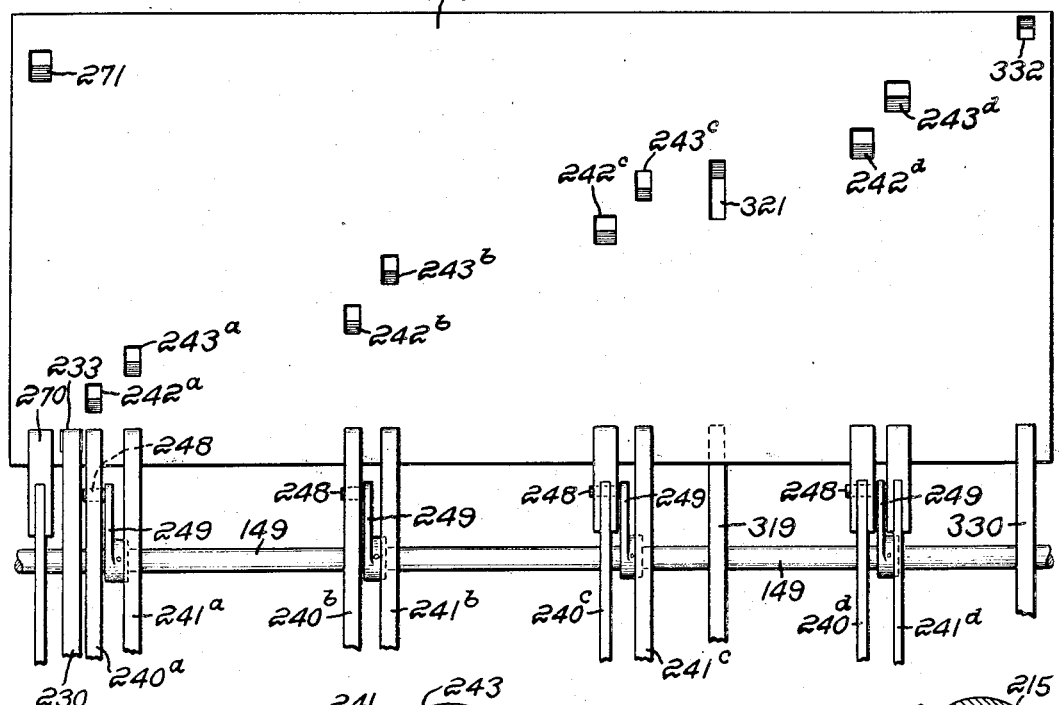
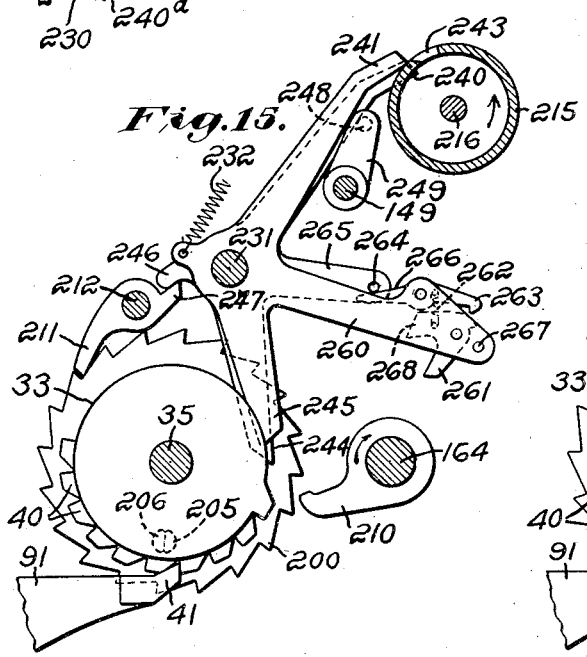
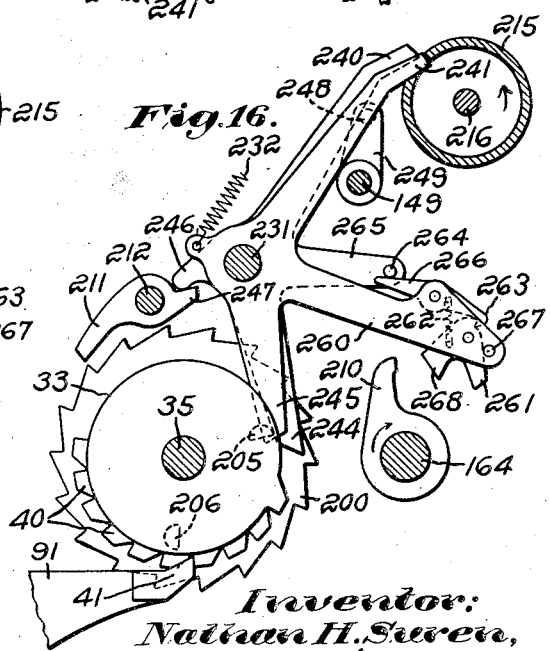
Inventor:
Nathan H. Suren,
by Emery Booth Janney Varney
Attys.

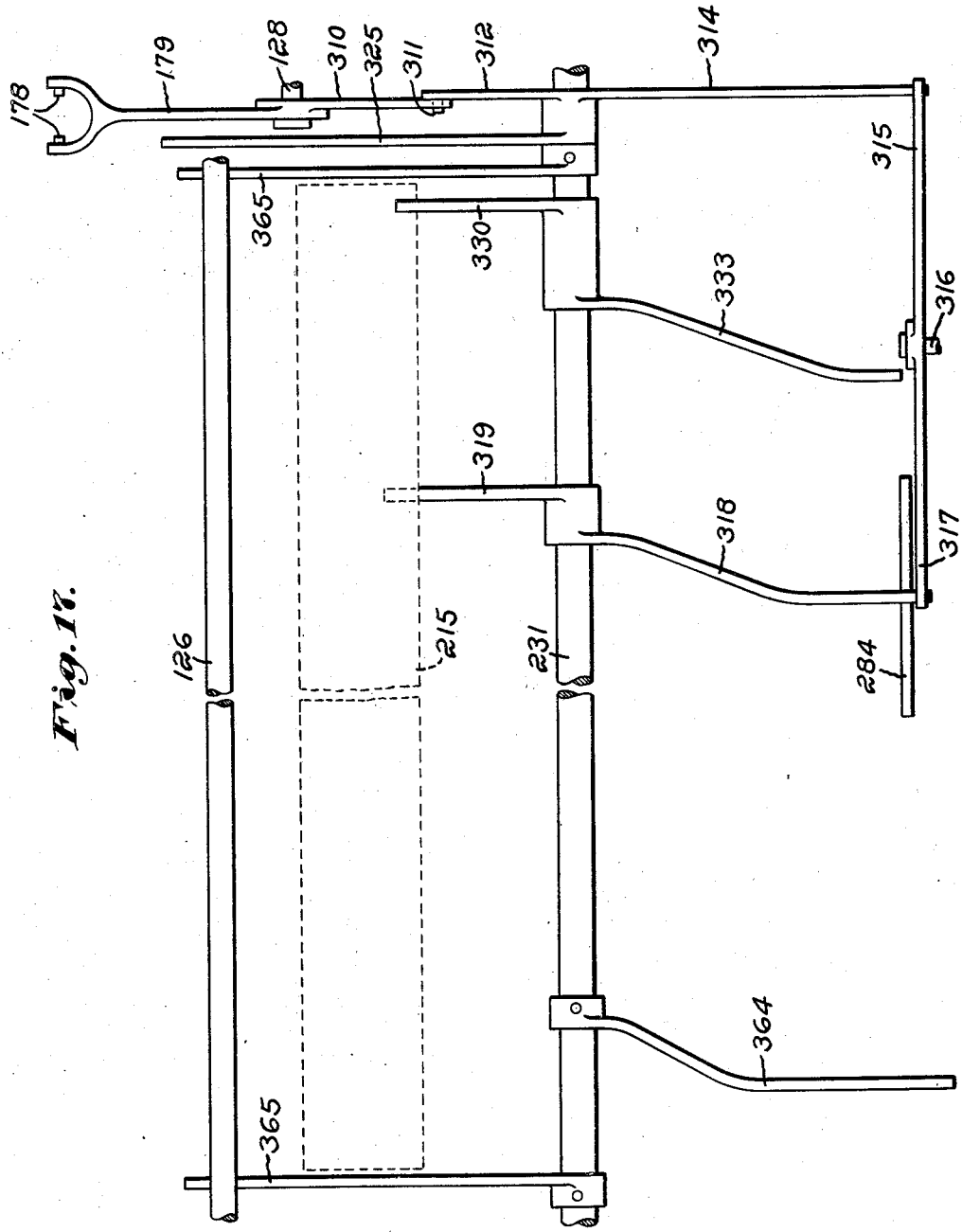

Patented Jan. 19, 1926.

1,570,596

UNITED STATES PATENT OFFICE.

NATHAN H. SUREN, OF NEEDHAM, MASSACHUSETTS, ASSIGNOR, BY MESNE ASSIGNMENTS, TO THE GAMEWELL COMPANY, OF NEWTON, MASSACHUSETTS, A CORPORATION OF MASSACHUSETTS.

TRANSMITTER.

Application filed November 15, 1919. Serial No. 338,287.

*To all whom it may concern:*

Be it known that I, NATHAN H. SUREN, a citizen of the United States, and resident of Needham, county of Norfolk, and Commonwealth of Massachusetts, have invented an Improvement in Transmitters, of which the following description, in connection with the accompanying drawings, is a specification, like characters on the drawings representing like parts.

This invention relates to apparatus for formulating signals represented by digits or groups of integers and particularly to such apparatus as is adapted to transmit such signals, with or without one or more repetitions, to one or more distant points.

In the form herein disclosed the apparatus is particularly adapted for employment in connection with fire alarm systems where it is required to quickly repeat any given code signal one or more times to a number of branch stations, each digit being transmitted in the form of a series of preferably equally spaced impulses or beats transmitted over electrical circuits and adapted to actuate gongs or other suitable signal devices at the branch stations, and each one of the digits constituting the signal being separated from its predecessor by a relatively long pause or interval, and successive rounds between signals being separated by a still longer pause or interval.

In the specific apparatus hereinafter described (to the details and specific features of which, however, my invention is not limited), the impulses or beats are transmitted through the transmitting circuits by a circuit-controlling member represented herein in the form of a rotary cylinder driven or actuated by clockwork or other suitable accurate timing mechanism, such member being adapted to break (or make, as the case may be) each of the transmitting circuits, once for each cycle of movement, and successive movements or rotations producing the succession of impulses which make up one digit of the signal.

Herein intervals between the digits and between the rounds are provided without stopping the continuous and constant movement of this circuit-controlling member by permitting one or more idle or ineffective rotations thereof.

A suitable driving mechanism for the apparatus is provided, together with mechanism for starting the cylinder into operation and for automatically stopping the same when the prescribed number of rounds have been completed.

The number of impulses which make up each digit is governed in the herein-described form of the invention by individual digit-setting elements, one for each of the several digits which may comprise the signal. These elements may be quickly and individually moved to set the apparatus for any given digit, the position to which any such element is set controlling the number of impulses transmitted or, in other words, determining the digit in the signal corresponding to that element.

These digit-setting elements are herein in the form of cylinders or wheels provided with radial teeth or stop devices and are yieldably connected each to an auxiliary setting element, which latter is moved back step by step as the impulses are transmitted until the number of beats given equals the digit for which the toothed wheel has been set, whereupon the auxiliary wheel is released and snaps back to its initially set position. Thereupon, after suitable pause mechanism has acted, the control of the constantly driven, contact-controlling drum and its contact-controlling devices passes to the next element of the digit-setting devices which has been set to determine the next digit of the signal. Each setting element is, therefore, quiescent except when brought into controlling relation and while controlling the sending of the impulses representing its particular group or digit.

The setting wheels are constantly urged to turn in the same direction and are brought to a position of rest corresponding to any particular signal by stop devices which are controlled by push buttons, keys or other controlling elements, an individual controlling member being provided for each digit in each group or set. By manipulating these elements which are readily accessible at the front of the machine, the operator can rapidly set up any desired signal, the number being herein set by pushing the corresponding buttons in rapid succession or simultaneously, if desired.

Combined with each group of push buttons controlling the individual digit-setting elements, there is also a controlling member in the form of a push button or key by which the setting element may be instantly restored to its zero or initial position, each setting element when set to any particular digit by the manipulation of one of the numbered keys being locked against movement unless released by pressing one of the other keys of the same group. In conjunction with these there is also provided a master release key by which all the setting elements may be released and restored to their zero positions simultaneously. By this means not only may the signal be quickly set up, but if it is desired to quickly reset the same, due to a mistake or for any other reasons, any individual digit of the signal may be quickly changed by pressing another key corresponding to the desired digit; or the entire signal may be reset by pressing the master release and setting up a fresh signal.

In conjunction with the individual setting wheels, I have also provided a controlling member in the form of a drum movable through a cycle which corresponds to the delivery of any one round. Such controlling drum not only controls the intervals or spaces between successive digits in the signal and between successive rounds, but it also provides means for transferring the control of the contact-controlling devices from one of the digit-setting wheels to the next succeeding digit-setting wheel in order of succession.

Means are also provided for setting the apparatus to automatically repeat the same signal several times, so that one, two, three or four rounds of signals may be automatically sent before the apparatus is automatically brought to rest.

The preceding enumeration of mechanisms has reference to the specific form of the invention hereinafter described, my invention, broadly, being capable of embodiment in many and widely different forms. These and other features of the invention will be best understood by reference to the following description when taken in connection with the accompanying illustration of one specific embodiment thereof, while its scope will be more particularly pointed out in the appended claims.

In the drawings:—

Figure 1 is a front elevation of the apparatus showing the arrangement of the several groups of digit-push keys and also showing the indicators and other parts on the face-plate in front of the operator;

Fig. 2 is a side elevation of the same machine;

Fig. 3 is a diagrammatic view or scheme showing the arrangement of the driving gearing by which a turning effort is individually and separately imparted to the several individual digit-setting wheels;

Fig. 4 is a similar diagrammatic view showing the driving gearing by which a turning effort is transmitted to the controlling drum and also the driving gearing by which a turning movement is imparted to the transmitting or circuit controller drum;

Fig. 5 is an elevation looking from the back toward the front plate of the machine and showing the rounds-controlling parts and other controlling devices associated therewith;

Figure 8:
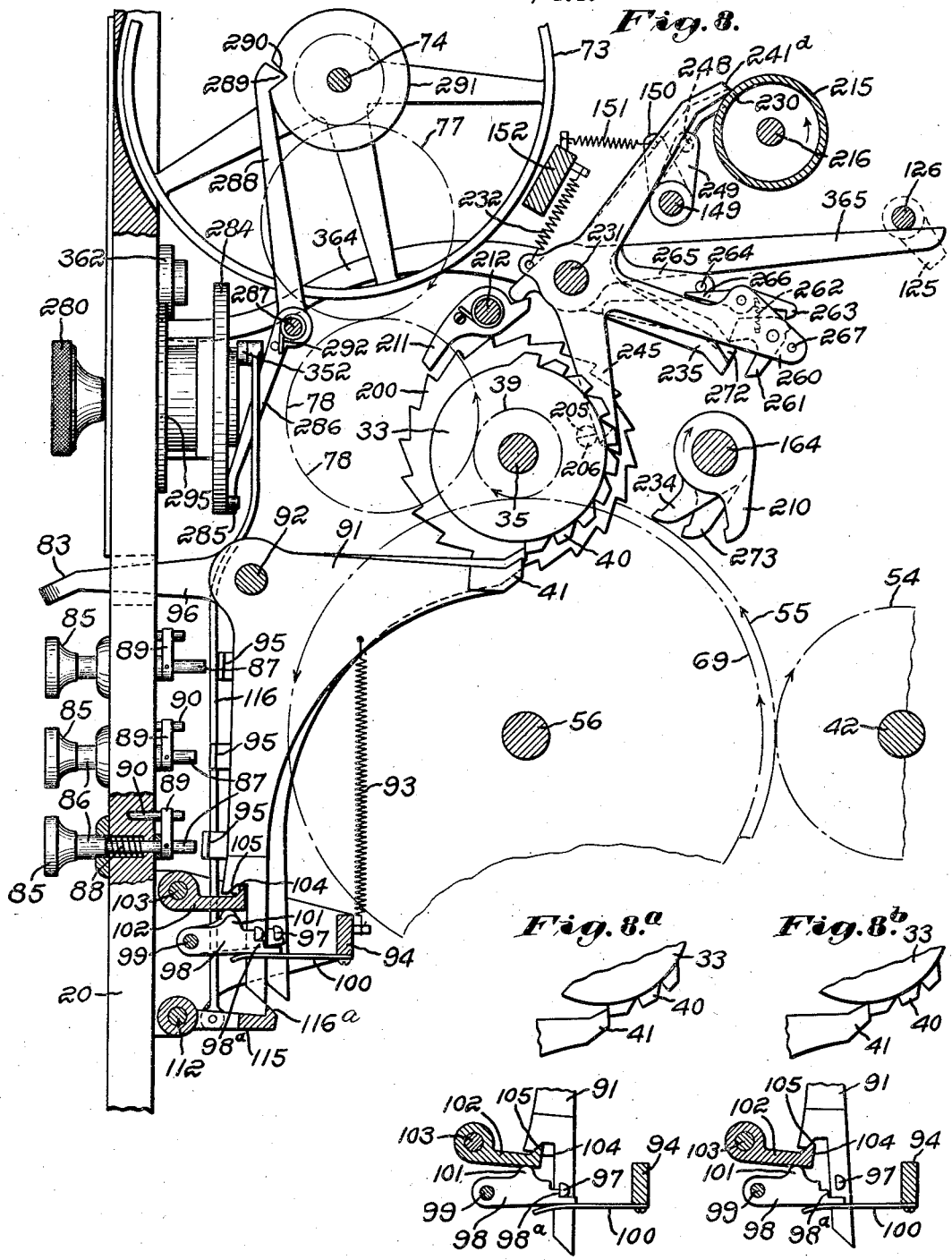

Fig. 5$^a$ is a detail in side elevation showing the rounds-controlling lever;

Fig. 5$^b$ is a central sectional elevation taken through the rounds-controlling shaft, taken on the line 5$^b$—5$^b$ in Fig. 5;

Fig. 6 is a view similar to Fig. 5 showing the rounds controller with the back cam plate removed and showing the escapement in its zero position;

Fig. 7 is a similar view showing the rounds controller set to send three rounds of signals;

Fig. 8 is a side elevation in partial section on the line 8—8 in Fig. 1, showing the digit-setting keys, the digit-setting wheels, controlling drum and other associated parts, the immediately adjacent digit-setting wheel being set in its zero position;

Fig. 8$^a$ is a detail showing by separated broken portions the position which the stop fingers assume with relation to the teeth of the number setting wheels when the digit setting key is first moved, and also the position simultaneously assumed by the lower ends of the stop fingers with relation to the locking mechanism;

Fig. 8$^b$ is a similar detail showing a subsequent position of the same parts;

Fig. 9 is a sectional elevation of a portion of the back of the machine showing the circuit-controlling drum and associated contact-controlling devices;

Fig. 10 is a rear elevation showing a number of the contacts and contact controllers;

Fig. 11 is a sectional elevation showing the driving and time-governing mechanism with certain of the controlling parts for starting and stopping the same;

Fig. 12 is a rear elevation in partial section showing the individual digit-setting wheels and the stop levers therefor;

Fig 13 is a side elevation showing the action of the master zero key;

Fig. 14 is a development in plan of the controlling drum together with the related controlling stop fingers;

Fig. 15 is a side elevation showing the position of the controlling drum and the controlling fingers at one point in the signal-sending cycle;

Fig. 16 is a similar view showing the same controlling parts at another point in the signal-sending cycle; and Fig. 17 is a plan view showing the relation of certain of the controlling levers.

Referring to the drawings and to the illustrative embodiment of the invention therein shown, the apparatus is contained within a casing, the front plate of which (Fig. 1) is shown at 20 and one of the side plates at 21 (Fig. 2).

Referring first to the individual digit-setting elements (Figs. 3, 8 and 12), these are in the form of wheels or cylinders 30, 31, 32, 33 and 34, mounted to turn freely upon the fixed shaft 35 extending from one side plate to the other, the wheels being connected to adjoining pinions 36, 37, 38 and 39 respectively, which latter in turn are connected to suitable driving mechanism, so that the digit-setting wheels are urged or impelled constantly and separately to turn in the direction of the arrows shown in Figs. 3 and 8. The digit-setting wheel 34 is connected to turn with the wheel 33, as will be hereinafter described.

Each of the digit-setting wheels 30, 31, 32 and 33 has projecting radially therefrom a series of teeth 40, forming stop devices,—there being ten teeth on each wheel although the series may be extended to any desired extent. These teeth are so arranged that they are adapted to move each against its respective stop finger 41 (see Fig. 8) when the latter is moved into the path of its respective tooth, there being provided a stop finger for each tooth on each digit-setting wheel. One tooth is provided for each digit on each wheel and in addition there is also provided a zero tooth which, as will more fully appear, brings the digit-setting wheel to rest in a zero or ineffective position. The series of teeth on each wheel corresponding to the various positions, 0, 1, 2, 3, etc., are arranged circumferentially in order of succession, the teeth being arranged also in a spaced relation longitudinally to provide working space between the teeth of successive digits. The wheels 30, 31, 32 and 33 are of substantially similar construction, the wheel 34, however, having a series of teeth angularly spaced and continuing the succession of teeth on the wheel 33, so that the two wheels 33 and 34 constitute in effect a single wheel with the teeth corresponding to the digits or number groups 0, 1, 2, etc., up to and including 18,—there being also provided a series of stop fingers for the teeth on the drum 34 corresponding to the numbers 10 to 18 inclusive.

This provides such a construction that by manipulation of the stop fingers through the push keys hereinafter described, any one of the wheels 30, 31, 32 may be released and brought to rest by a selected tooth in any desired position and corresponding either to the zero position or to any one of the digits 1 to 9 inclusive, while the wheels 33 and 34 may be similarly set to any position corresponding to the zero position or to the numbers 1 to 18 inclusive.

Any suitable means for applying a constant and independent turning moment to each of the digit-setting elements might be employed, as, for example, a separate weight or spring for each wheel, with means for winding them up from time to time, but herein all the driven parts of the machine are related to and driven from a common source of power adapted to exert a constant turning effort on the main driving shaft 42, so that it is constantly urged to turn in the direction of the arrows shown in Figs. 2 and 3. The driving shaft 42 may be driven by any suitable means, but herein it has connection through the sprocket chain 43 with any usual and suitable weight or spring motive device (not herein shown), which latter is also provided with suitable and usual means (not herein shown) for winding the same up from time to time.

In order to transmit the turning effort of the shaft 42 to the several digit-setting elements, as well as to various other motor-actuated elements hereinafter described, so that each one is independent of the others as to conditions of rest or movement, there is provided a system of differential or compensating gearing elements by which the power of the driving shaft 42 is separately transmitted to the several driven elements.

Referring to the diagrammatic showing in Fig. 3, the turning movement is transmitted from the drive shaft 42 to the digit-setting elements through a compensating gear device having the central driving element 44 fixed on the driving shaft 42 and having the two adjoining driven elements 45 and 46 loose on the driving shaft and fixedly connected respectively to gears 47 and 48. For simplicity, the various differential transmission devices which are employed in the illustrated apparatus are shown in diagrammatic or conventional form only, since the construction of these devices is well known and understood, and any suitable differential or compensating transmission gear may be employed, an example of such device being shown in the prior patent to Matthews No. 410,425, Sept. 3, 1889.

The turning effort of the gear 47 (which may move independently of and without reference to the gear 48) is transmitted through the pinion 49 to the counter-shaft 50. The latter has a pinion 51 at the opposite end meshing with a gear 52 loose on the shaft 42 and connected to the central driving member of a compensating gear the two driven members of which (also loose on the shaft 42) are connected respectively to the gears 53 and 54. The gear 54 (which moves independently of gear 53) meshes with a gear 55 fast on the countershaft 56. To the shaft 56 is fixedly secured the central driving member 57 of a differential transmission, the driven members 58 and 59 of which are free to turn on the shaft 56 but are connected to turn the driving members 60 and 61 of two adjacent differential transmissions also on the shaft 56. The driven members 62 and 63 of one transmission are loose on the shaft 56 and are connected to turn the gears 64 and 65 respectively, while the driven members 66 and 67 of the remaining transmission are also loose on the shaft and connected to drive the gears 68 and 69 respectively. The gears 64, 65, 68 and 69 engage directly with the aforesaid pinions 36, 37, 38 and 39 respectively, mounted on the shaft 35 and connected to impart turning movement directly to the independent separate digit-setting wheels 30, 31, 32 and 33 respectively.

Through the means described each digit-setting wheel when released will be turned in the direction of the arrow shown in Fig. 8, and will continue to turn until brought to rest by one of the stop fingers, the movements of the various transmitting parts taking place in the direction of the arrows shown in Fig. 3. Through the differential transmission devices each digit-setting element is not only subjected to a constant turning torque and is ready to move the instant it is released, but the movement takes place without affecting or being affected by the turning torque simultaneously applied to the remaining elements.

In connection with the digit-setting elements, means are preferably provided for indicating the position of the digit-setting wheels by displaying at the front of the face-plate the number combination to which they have been set. Herein this indication is secured by providing a series of indicator dials 70, 71, 72 and 73, one for each digit-setting element, such dials being loosely mounted side by side upon the shaft 74 (Figs. 2, 3 and 8) and bearing digits upon their periphery which, as the dials turn, are adapted to be brought into the view of the operator through the transparent panels 75 at the front of the face-plate (see Fig. 1). The dials are mounted to turn loosely and independently of each other on the shaft 74 and are geared each to its respective digit-setting wheel by means of intermeshing gearing comprising in each case a pinion 76 and intermediate gears 77 and 78, the latter gears engaging the pinions 36, 37, 38 and 39 which move with the digit-setting wheels. Each indicator wheel, therefore, is given a movement proportionate to the movement of its digit-setting wheel and the digits are so arranged on its periphery that they indicate the digit to which such wheel is set. The wheels being arranged side by side, the signal or digit combination to which the machine is set at any time is easily readable with the individual digits in closely adjacent and unvarying relation. Thus, if one digit-setting wheel is released and stopped at the position corresponding to the digit 3, the digit 3 simultaneously appears at 75.

Referring now to the individual actuating devices for the digit-setting mechanism and to the keys or buttons for manipulating the stop fingers and setting the digit-setting wheels, these are arranged in four banks or groups indicated at A, B, C and D, Fig. 1, one bank for each one of the individual digits of the signal and for each digit-setting wheel. The digit keys in Fig. 1 are designated by the digits which they represent, the zero keys being shown at 80, 81, 82 and 83, and there being also provided a master zero key 84 for the purpose hereinafter described.

Each digit key (Fig. 8) is provided with a finger piece 85 secured to a plunger 86, the latter carrying the actuating pin 87. The plunger works in a pocket or recess in the face-plate 20 and has the spring 88 which normally forces it outward, but permits each key to be pressed inward to cause the end of its actuating pin to move its respective stop finger. Each actuating pin 87 has an arm 89 engaging a fixed guide pin 90 to give it the necessary guidance. Each stop finger 41 (Figs. 8 and 12) consists of a hardened steel dog of a size and shape suitable to engage with its corresponding projecting tooth 40 on the stop wheel and is carried by one arm of a bell-crank stop lever 91. The stop levers, which are fulcrumed upon a shaft 92, have depending portions and are relatively thin, so that they may be arranged side by side in compact relation, as indicated in Fig. 12 where they are shown partly broken away. Each stop lever is connected to a tension spring 93 (Fig. 8), the lower end of which is attached to a fixed transverse bar 94, so that the lever with its stop finger is normally drawn down to the position indicated by the foremost stop finger in Fig. 8, where it is out of the path of its respective tooth on the digit-setting wheel. Each depending portion of the stop lever, however, carries at its front edge a small flanged plate or clip 95 (some, but not all of which, are shown in Fig. 12), the flanged end of which is positioned to underlie the respective actuating pin 87 of the corresponding digit key, so that when any digit key is pushed the pin will engage the flanged plate 95 and move the stop lever to elevate the stop dog into the position occupied by the zero stop finger as indicated in Figs. 8 and 12.

The zero bell crank stop levers are of similar construction to the digit levers already described, except that each zero lever has a forward extension 96 passing through a slot in the face-plate 20 and presenting the finger portions 80, 81, 82 and 83 respectively, depression of which has the effect of moving the zero stop lever and raising its stop finger.

Means are preferably provided for automatically locking any stop lever when moved to its stop position until some other stop lever is subsequently moved to give the apparatus a different setting. For this purpose the lower end of each stop lever (Figs. 8, 8$^a$, 8$^b$ and 12) is provided with a lateral locking pin 97 having a flattened face adapted to cooperate with a shoulder 98$^a$ on the locking dog 98, there being fulcrumed on the fixed rod 99 an individual locking dog for each stop lever, the dogs working within the spaces between adjacent stop levers. Each dog is pressed up by its individual leaf spring 100 carried by the fixed cross-bar 94, so that it is urged to move up in front of its locking pin 97, and, when in that position, prevents the stop lever from moving out of its stop position.

To depress the dog 98 and free any given stop lever when the key for some other lever of the same bank is pressed to reset the apparatus, each dog has at its upper edge a cam 101 adapted to contact with the lower face of a swinging plate or cradle 102 pivoted on the rod 103, there being one such plate or cradle for each of the four banks A, B, C and D. The swinging plate 102 has at its end a beveled lip 104 which is adapted to enter a notch or recess formed in the depending portion of each stop lever, each stop lever presenting a beveled wall 105 adapted to engage the beveled lip 104 on the plate.

When the apparatus is in its zero or unset condition, the levers of each group are as indicated in Fig. 8, the zero levers being moved into a stop position with the locking dogs 98 engaging the locking pins 97, while the digit levers are in the position there indicated with their stop fingers out of the path of the teeth 40 and the beveled lip 104 on the cradle 102 occupying the relation to the notch or recess 105 there indicated, where a substantial clearance is shown.

The relation between the beveled lip 104 and the notch 105 allows for some lost motion so that when any digit stop lever is moved by pressing its corresponding key, the stop lever is moved to such a position as to throw its corresponding stop finger into the path of its tooth on the wheel, as indicated in Fig. 8$^a$, before the cradle 102 has been depressed. This insures the stoppage of the digit wheel by the stop finger thus elevated, as soon as the digit wheel is released from its zero position by the further movement of the digit key. Further movement of the digit key causes the beveled wall 105 to move against the beveled lip on the plate or cradle, depressing the same and causing a simultaneous depression of all the locking dogs 98 belonging to that group, elevating the stop finger 41 still further and bringing the parts to the position shown in Fig. 8$^b$. This releases all digit-setting levers of that group including the zero stop lever which is immediately thrown back to its normal or inoperative position by its spring 93, releasing the digit-setting wheel and permitting it to snap or move quickly to the position prescribed by the last-moved digit stop lever. As the pressure on the digit key is withdrawn, the corresponding stop lever yields or moves back slightly, bringing the parts operatively related thereto, including the stop finger 41, from the position shown in Fig. 8$^b$ back to the position shown in Fig. 8$^a$.

As soon as this slight backward movement of the stop lever takes place, the spring 100 forces the locking dog up, urging the cradle also upwardly, the engagement of the locking pin 97 with the shoulder 98$^a$ securely locking the actuated stop lever against further movement until the apparatus is again reset by pressing another key. The locking pin 97 of the freed lever is meanwhile moved back over its locking dog, as indicated in Fig. 8, holding the same ineffective until the lever is again moved.

This apparatus, therefore, provides that any one of the digit-setting wheels may be instantly set to the position corresponding to any digit contained in its group by pressing the corresponding digit key, whereupon the digit setting wheel remains locked in that position until some other key is pressed. It therefore follows that not only may the apparatus be set up as to any digit instantly, but it may be instantly reset in case of a mistake or desired correction by pressing some other key. By pressing the appropriate zero key any one of the four digit-setting wheels may be restored to its zero position where it has no effect in transmitting beats or impulses to the branch stations.

Means are preferably provided whereby all the digit-setting elements representing the four groups of digits may be simultaneously reset to a zero position, as well as individually or separately so reset. For this purpose a master zero key 84 (Fig. 1) is provided which is so connected that its movement simultaneouly moves all four of the individual zero keys 80, 81, 82 and 83. Referring to Figs. 12 and 13, the master key 84 is connected to a lever arm 85 pivoted on the rod 92 and having the depending link 110 connected to an arm 111, which latter is secured to the shaft 112. Opposite the depending end of each zero stop lever, and adapted to engage with the edge thereof, there is provided a finger 113 secured to the shaft 112. This finger is such that when the master key 84 is depressed, it is swung toward the edge of the zero key, forcing the latter forward and throwing the zero stop lever into its stop position. This occurs simultaneously with each of the four zero keys, so that by pressure of the key 84 each digit-setting wheel, if set for any given digit, is instantly released and the entire apparatus restored to its zero condition.

After the operation of the transmitter has been initiated, all of the stop levers are automatically locked into position by a locking plate 115 (Figs. 8 and 12) which is mounted to swing upon the shaft 112 and underlies the lower ends of the entire series of stop levers. When the apparatus is started into operation this plate is automatically lifted through a link 116 by means hereinafter described, and this brings an upturned beveled edge 116$^a$ into such relation with the lower beveled edges of the stop levers that both those occupying a stop position and those which are in their normal or release position are held in their respective positions against further movement until the apparatus has completed the predetermined signal and has stopped.

Referring now to the transmitting mechanism and particularly the circuit-controlling devices (Figs. 9 and 10), any number of transmitting circuits may be employed leading to the various branch stations, an impulse being sent through each of the series of circuits for each cycle of movement of the machine. To simplify the drawings, the connections for a few only of these circuits are shown in Figs. 9 and 10, but it will be understood that their number may be extended indefinitely. Referring to Figs. 9 and 10, each circuit is connected to the two members of a pair of contact fingers 120 and 121, these fingers being mounted upon an insulating support 122, and each pair of fingers being insulated from the adjacent pair. The ends of the contact fingers project beyond the insulating support and are normally in contact with each other at 123, maintaining the corresponding circuit closed. Each pair of contacts, however, has one of the fingers prolonged beyond the other to overlie a contact lifter pin 124, the latter being carried by a lifter arm 125, there being a series of such lifter arms and lifter pins, one for each pair of contacts, all fulcrumed to swing upon the rod 126, which latter is carried at its end by arms 127 mounted to turn about the studs 128 in the machine frame. The lifter arms 125 have a limited movement between stop rods 129 and 130, and, when moved upwardly, each lifter lifts the prolonged contact finger and breaks the corresponding circuit.

The circuits are herein shown as normally closed, but normally open circuits may be employed in whole or in part, if desired, the impulse or beat being determined by cessation of current flow. The lifters, in that case, when actuated merely serve to move the overlying contact finger to a closed position instead of an open position.

To actuate the lifters each arm 125 carries a cam roll 131 which contacts with the surface of a circuit-controlling drum 132. When the apparatus is in operation, the circuit-controlling drum is given a constant rotation in the direction of the arrow shown in Fig. 9, and, excepting under conditions hereinafter described, when the lifter rods are held inoperative, this rotation of the drum 132 serves to raise each one of the lifters, once for each rotation of the drum, and momentarily breaks (or makes, as the case may be) each one of the transmitting circuits, thus serving to transmit one beat or impulse for each rotation of the drum 132.

To raise the lifters, the drum is provided with a cam surface, herein comprising a raised portion 133 extending the length of the drum and preferably arranged as indicated in Fig. 10 in a series of advancing steps or a general helical relation lengthwise the drum, so that the circuits are broken one after another in rapid succession and not simultaneously.

In order to provide the desired intervals or pauses between the last stroke of one digit and the first stroke of the succeeding digit in the same signal, as well as between successive rounds of signals, means are provided for rendering the circuit-controlling devices inoperative at the required times, while at the same time permitting the continued rotation of the constantly rotating controlling drum 132. Since the drum continues to make one revolution for a definite interval of time while the apparatus is in operation, these intervals, therefore, can be provided and are accurately and uniformly timed by permitting one or more ineffective rotations of the constantly driven drum to take place between certain effective rotations thereof.

For this purpose each of the swinging arms 127 has connected to it a pivoted depending finger 140 adapted to be held at either one of two positions. In the full line position shown in Fig. 9, it has no effect in preventing the normal action of the lifters. When swung to the dotted line position indicated, however, it lies directly over a raised portion or lug 141 presented by the swinging arm 142, the latter pivoted at the side of the machine upon a fixed stud 143, and carrying at its free end a cam roller 144 adapted to engage a cam 145 mounted at the end of the drum 132 and connected to rotate therewith. At each rotation of the drum, and during such period as the latter is acting to raise any of the lifters, the roller 144 is being engaged by a raised portion 146 on the cam 145 so that the free end of the arm 143 is held elevated. When the finger 140 is in the dotted line position shown in Fig. 9, this lifting movement of the arm 142 acts through the finger 140 to raise the arms 127 and elevate the lifters to the dotted line position shown, in which position the rotation of the controlling cylinder is ineffective to break the circuits, the lifter pin in each case being raised beyond the point of engagement with the overlying contact finger.

The result is that, while each lifter is actuated once for each revolution of the drum, when the finger 140 is in the dotted line position (Fig. 9) the arm 142 is also oscillated and the entire bank of lifters is held in an inoperative position during such part of the drum rotation as any of the lifters is engaged by the cam 133.

The finger 140 is under the control of suitable governing mechanism hereinafter described but is normally thrown to the dotted line position shown in Fig. 9 by a link 147, the opposite end of which is pivoted to an arm 148 secured to and depending from the shaft 149. The latter has the upright finger 150 connected to the spring 151, the opposite end of which is secured to the fixed transverse bar 152, so that by means of the spring the link is normally moved in the direction of the arrow shown in Fig. 9 and the finger 140 thrown to the dotted line position where it renders the contact lifters inoperative when the drum is rotated. The mechanism for controlling the finger 140 and the shaft 149 to render the lifters operative will be hereinafter described.

Referring next to the driving mechanism for the circuit-controlling drum 132, such driving mechanism is connected to the main drive shaft 42 and is provided with suitable starting and stopping devices and suitable governing mechanism whereby the rotation of the drum will be accurately timed to a constant predetermined speed.

Referring more particularly to Figs. 4 and 11 (the former showing diagrammatically the arrangement of the driving gearing), driving movement is transmitted to the circuit-controlling drum 132 from the gear 48 of the differential transmitting device 44. The gear 48 meshes with an intermediate gear 160, the latter engaging a pinion 161 secured directly on the shaft 162 which carries the main controlling drum 132. Meshing also with the gear 160 is a gear 163 secured to a cam or actuator shaft 164, the gear 163 being of the same diameter as the gear 161, so that the actuator shaft is turned at the same speed as the drum shaft 162. One function of this actuator shaft, as will be more fully explained, is to initiate the successive movements of the apparatus under the control of the governing mechanism.

To govern and control the speed of the drum shaft 162, the latter has secured thereto (Figs. 4 and 11) a worm gear 165 meshing with the worm 166 on the upright shaft 167 adapted to turn in bearings 168 and 169 on the frame of the machine. The shaft 167 has secured thereto the relatively small fan governor blades 170, and there are also provided the relatively large fan blades 171, which latter may be connected to or disconnected from the shaft, as hereinafter explained, so that the speed of rotation of the shaft and its connected drum shaft 162 may be accurately timed to either one of a plurality of constant, predetermined speeds.

To start and stop the circuit controller drum, suitable controlling means are employed, herein in the form of a cone-shaped friction member 172 fixed to the shaft 167 and adapted to be engaged by a brake sleeve 173 having a cooperating tapered or cone-shaped seat, the brake sleeve being mounted to slide upon the fixed or rigid sleeve 174 through which the rotary shaft 167 passes. The brake sleeve 173 is prevented from turning on the fixed sleeve 174 by means of the fixed pin 175 on the rigid sleeve, which pin engages a groove 176 in the bore of the brake sleeve. The brake sleeve has a circumferential groove 177 engaged by pins 178 carried by the yoke lever 179. The latter is controlled by controlling devices hereinafter described, the construction being such that, when the brake sleeve is raised to the position shown in Fig. 11, all rotative movement of the shaft 167 and the cylinder drum shaft 162 is prevented. When the sleeve is lowered, these two elements are left free to rotate and rotation immediately begins under the governing action of the fan blades and continues at a constant rate until the brake sleeve is again lifted to stop it.

Two sets of fan blades are herein provided, so that the apparatus may be operated in either fast time or slow time for the sending of signals of either a rapid rate or a relatively slow rate. To this end the larger fan blades 171 are secured to a sleeve 180, the latter loose on the shaft 167 and adapted to be raised or lowered on the same. In the lowered position of the sleeve, the latter seats against a shouldered member 181, to which the blades 170 are secured, and causes the horizontal fingers 182, rigidly attached to the blades 171, to fall between upright pins 183 fixed to the blades 170. This clutches the blades 171 to the blades 170 so that both sets of blades turn with the shaft 167 and are effective in governing the speed of the circuit controller drum, causing it to operate at a relatively slow speed.

To disconnect the fan blades 171 and operate at the faster speed, the sleeve 180 has secured thereto the grooved collar 185 adapted to be engaged by the yoke-shaped lever 186 pivoted at 187 on the machine frame. When the lever 186 is lifted, the blades 171 are disconnected from the blades 170, leaving the latter to govern the movement of the controlling drum and allow it to operate at a fast speed.

To permit the operator to shift the apparatus quickly from the fast speed to the slow speed, or vice versa, the controlling lever 186 has a bell-crank arm 188, the end of which is slotted and engages with the pin 189 carried by a lever arm 190 fulcrumed at 191 on the frame of the machine. The lever arm 190 is connected to another bell-crank arm 192 extending to the face-plate and overlying a cam 193 (see left-hand Fig. 5). This cam is mounted to turn at the back of the face-plate and is connected to a knob or handle 194 at the front of the face-plate and also to an indicating pointer 195 (see Fig. 1).

When turned to the position shown in Fig. 5 and designated in Fig. 1 as "slow," the short radius of the cam underlies the lever 192 and the latter is drawn down by the spring 196 (Fig. 11), so that it acts on the lever 186 to depress the fan blades 171 and keep them in engagement with the blades 170, thus providing for the slow speed.

When the handle 194 is turned to swing the indicator pointer to the position designated as "fast," the high portion 197 of the cam 193 is moved under the lever 192, raising the latter and elevating the fan blades 171 so that they are held disconnected from the fan blades 170. This leaves the shaft 167 connected only to the relatively narrow fan blades and provides for the fast rotation of the shaft and the rapid sending of signals. The speed of transmission, therefore, may be changed quickly from fast to slow, or vice versa, by turning the pointer 195 from one position to the other.

After the transmitter has been set into operation (by means to be hereinafter described), the contact-controlling drum 132 continues to rotate and the contact lifters continue to send out beats or impulses separated by suitable intervals to form the digits prescribed by the position of the digit-setting wheels. This is accomplished under the control-governing mechanism including a controlling member in the form of a drum and including such digit-setting wheels as have been moved from the zero position.

An understanding of the operation of these governing devices will be best had by first considering the coordinate functioning of an individual digit-setting wheel, the controlling drum and appropriate pause devices in transmitting the beats which go to make up one digit of the signal.

Referring to Fig. 12, each one of the digit-setting wheels 30, 31, 32 and 33 has connected thereto a ratchet 200, such wheel having a drum-like hub 201 within which there is a coiled flat spring 202. One end of this spring is secured to a pin 203 fixed in the face of the adjacent digit-setting wheel and the other end to a pin 204 fixed on the ratchet. This spring yieldably connects the ratchet to the digit-setting wheel and urges or tends to turn the former always in the same direction to bring the flattened side of a stud or pin 205, projecting laterally from the face of the ratchet, against the flattened side of an oppositely projecting stud or pin 206 fixed in the side of the digit-setting wheel. This permits the ratchet to be turned back with relation to the digit-setting wheel (or counter-clockwise as viewed in Fig. 16), thereby separating the two pins by a greater or less angular interval (see Fig. 16). When released, however, the coiled spring 202 will turn or snap the ratchet right-handedly (as viewed and indicated in Fig. 15) until the stop pin 205 on the ratchet is brought to rest by the stop pin 206 on the digit-setting wheel. In other words, the ratchet will follow any left-handed or clockwise (as viewed in Fig. 15) movement of the digit-setting wheel in fixed relation thereto unless independently held or moved back. If held or moved back, however, the instant it is released the ratchet will then follow up and overtake the digit-setting wheel and normally maintain the angular relation thereto prescribed by the stop pins 205 and 206.

To actuate the ratchet wheels, there are secured to the actuator shaft 164, hereinbefore referred to, and each in the same angular relation or alignment thereon, four dogs 210 (Figs. 8, 15 and 16), one such dog being aligned with each one of the ratchets 200 and adapted on each rotation of the actuator shaft (which turns clockwise in the direction of the arrow shown in Figs. 8, 15 and 16) to engage a tooth of the ratchet and move the latter through a space equal to one step or tooth.

When any particular digit-setting wheel has been placed in governing relation to the contact lifters through the controlling drum, as hereinafter described, its ratchet wheel, when moved ahead one tooth by the dog 210, is held in that position by a holding pawl 211 (Figs. 8, 15 and 16), the several pawls being fulcrumed to turn upon a rod 212 extending across the machine. When the controlling drum has shifted the control from any particular digit-setting wheel, the corresponding dog 211 is thrown to an inoperative position, as shown in Fig. 16, so that the successive rotations of the actuator shaft 164 merely result in moving the ratchet wheel one step and then allowing it to fly back against the stop pin 206.

The controlling drum which controls the position of the holding pawls 211 herein consists of a drum or cylinder 215 mounted to turn with the shaft 216, which latter has a constant turning effort applied thereto to impel the same in the direction of the arrows shown in Figs. 8, 15 and 16. The drum has a series of notches or depressions in its periphery adapted to cooperate with a series of stop fingers which control the movements of the drum and in turn are moved thereby to govern the functioning of the digit-setting wheels. The drum is so arranged that it makes one complete rotation by successive steps for each complete signal or round transmitted.

Referring to Fig. 4, the drum 215, as stated, has applied to it a constant turning effort by means of the gear 217 secured thereto and meshing with a gear 218 fixedly secured to the gear 219, the latter arranged to turn on the stud shaft 128. The gear 219 meshes with a gear 220 which, together with the gear 221, is secured to the sleeve 222 mounted to turn loosely on the circuit-controlling drum shaft 162. The gear 221 meshes with the gear 53 which is connected to one side of a differential transmission, the opposite side of which turns the digit-setting wheels through the gears 54, 55, etc.

Referring to Figs. 8, 15 and 16, and also to Fig. 14, wherein a plan or development of the drum 215 is shown, in the normal or quiescent condition of the apparatus and before it is started into operation, the drum 215 is held fixed by a stop or holding dog 230. This dog is pivoted upon the transverse rod 231 and is connected to a tension spring 232 fixed to the crossbar 152 so that the end of the dog is depressed against the surface of the drum 215 in line with a notch or recess 233 therein, into which notch it enters and holds the drum against further movement when the latter turns to bring the notch beneath the dog. This condition is illustrated in Fig. 8.

When the machine is started into operation and the actuator shaft 164 starts to rotate, the holding dog 230 is lifted and the drum 215 released and allowed to turn to its next position wherein it initiates the transmission of the signal under control of the first digit-setting wheel. For this purpose the actuator shaft 164 carries a starting finger 234 which is aligned with the stop dog 230, and is adapted to engage with the end of an arm 235 extending downwardly therefrom and throw the dog out of the notch and release the drum. As soon as the drum shifts its position, the stop dog 230 rests against the unbroken surface of the drum and is held up out of the path of the finger 234 until the latter has made one complete turn through successive positions of rest and has again brought the notch into registration with the stop dog.

To coordinate each digit-setting wheel with the controlling drum 215, there are provided for each wheel two stop levers 240$^a$ 241$^a$, 240$^b$, 241$^b$, 240$^c$, 241$^c$, etc. These are also fulcrumed upon the shaft 231 and are arranged in line respectively with stop notches 242$^a$, 243$^a$, 242$^b$, 243$^b$, etc. These stop notches are so arranged in succession that as the drum is turned the notch 242 for one of the digit-setting wheels passes under its lever 240, then the notch 243 passes under its lever 241, and next the notch 242 for the next digit-setting wheel passes under its corresponding lever, and so on. The levers 240 and 241 of each set have depending arms 244 and 245, respectively, the arm 244 for the lever 240 lying within the path of the lateral pin 205 (see Fig. 12) carried by the ratchet 200, and the depending arm 245 on the stop lever 241 lying within the path of the lateral pin 206 carried by the digit-setting wheel. When any digit-setting wheel is in its zero position, as indicated in Fig. 8, the pins 205 and 206 press against the lower ends of the respective arms 240 and 241, throwing the upper ends of said stop levers up and preventing their dog-shaped ends from entering the stop notches if the latter pass under the levers when the drum is released by movement of the holding lever 230. Under such circumstances the drum continues to turn until brought to rest by the stop lever belonging to some other digit-setting wheel which has been moved away from the zero position.

When the digit-setting wheel is set, however, by pressing one of the numbered keys, for example, the key for number 6, the wheel and its ratchet move to a position as shown in Fig. 15, which will withdraw both the pins 205 and 206 from engagement with the depending arms 244 and 245, permitting the levers 240 and 241 to be thrown down, each by a suitable tension spring (not shown) similar to the spring 232, so that the dog-shaped ends of said levers become free to enter each into its respective stop notch on the face of the controlling drum when the latter is moved to a suitable position to permit such entrance.

If the digit-setting wheel 30 corresponding to group A, therefore, has been set by pressing the number 6 key, then as soon as the operation of the machine is initiated and the actuator shaft 164 has made one revolution to lift the stop dog 230 and release the controlling drum, the latter will advance from the position shown in Fig. 8 to that shown in Fig. 15, whereupon the end of the stop lever 240$^a$ enters the stop notch 242$^a$, bringing the drum to rest.

Simultaneously the holding pawl 211, which (Fig. 8) has been previously held out of engagement with the teeth of the ratchet 200 by a finger or lug 246 projecting from the lever 240 and engaging a heel 247 on said pawl, is allowed to drop into engaging relation with the ratchet and hold the ratchet against retrograde movement during whatever interval the stop lever 240$^a$ remains in the notch 242$^a$.

The movement of the stop lever 240 also brings the latter into contact with a pin 248 carried by an arm 249 secured to the shaft 149 (which latter, as heretofore described, controls the contact lifters), and this turns the shaft and its connected link 147 and finger 140 moving these parts, as represented in Fig. 15, to the full line position shown in Fig. 9, rendering the contact lifters operative and maintaining them operative until the stop lever 240 is again lifted from its notch in the drum. While such a condition is maintained, therefore, each successive rotation of the contact controlling drum 132 and the synchronously-driven actuator shaft 164 transmits a beat or impulse through each of the transmitting circuits, the successive beats or impulses in any one circuit being equally spaced due to the constant rotation of the drum. At each rotation of the contact-controlling drum, or at the completion of each series of signal impulses transmitting, the dog 210 on the actuator shaft engages the ratchet 200 and moves the latter backward one step. When a number of beats have been transmitted corresponding to the digit to which the digit-setting wheel has been set, or, for example, as shown in Figs. 15 and 16, when six movements of the ratchet wheel have taken place, the pin 205 on the ratchet will have been brought back to its zero position where it engages with the depending end 244 of the stop lever 240 and moves the latter, causing the opposite or dog-shaped end thereof to withdraw from the stop notch 242 and release the controlling drum.

This movement also serves simultaneously to depress the heel 247 of the holding pawl 211 and free the ratchet. The ratchet immediately snaps back to the position shown in Fig. 15. Simultaneously the drum 215 turns forward one step until brought to rest by the stop lever 241 as hereinafter described, leaving the lever 240 and the holding pawl for that particular ratchet in the positions represented in Fig. 16. At the same time, also, the underlying finger 248 follows up the receding stop lever, permitting (Fig. 9) the pull of the spring 151 to restore the contact-lifting devices to an inoperative state.

Since this point in the operation of the transmitter represents the completion of one digit in a signal, an interval is provided between the last beat of that digit and the first beat of the succeeding digit, which interval is herein made to correspond to two revolutions of the controller drum and actuator shaft, or, in other words, twice the interval occurring between successive beats in the same digit. This interval is provided by permitting the contact lifters to remain inoperative.

For this purpose the controller drum 215 is stopped in its movement by the stop lever 241 which, owing to the position of the stop pin 206, is free to enter the next notch 243 (as in Fig. 16) and hold the drum in that position while the actuator shaft makes one complete revolution.

To release the controlling drum 215 from the stop lever 241 at the end of the described interval and transfer the control to the next digit-setting wheel, the lever 241 has a rearwardly extending projection 260 on which is pivoted a dog 261 normally held by the spring 262 in the position shown in Figs. 8 and 15. This dog, however, lies within the path of the arm 210 on the shaft 164 and is oscillated by the arm upon each rotation of the shaft. This oscillation has no effect on the functioning of the parts, however, until the controlling drum turns to the position shown in Fig. 16 and is held by the stop lever 241. Thereupon the next succeeding engagement of the arm 210 with the dog moves it to the position shown in Fig. 16 where it is caught and temporarily held by a detent hook 263 pivoted on the arm 260 and adapted to engage a notch in the dog. The detent is prevented from catching the dog, except at such times as the stop lever 240 is lifted and the lever 241 simultaneously depressed into its stop notch, by means of a pin 264 carried by a rearwardly extending arm 265 on the stop lever 240 and overlying an extended projection 266 on the detent.

In this position the dog is prevented from further turning by resting against a fixed pin 267. On the next rotation of the actuator shaft 164 the arm 210 strikes a part 268 carried by the dog and forcibly lifts the stop lever 241 out of its notch 243, releasing the controlling drum and allowing it to move up to its next position. The stoppage of the drum by the stop lever 241 has thus provided for an interval between the digits equivalent to two rotations of the contact-controlling drum 132.

The movement of the lever 241 throws out the catch or detent 263, frees the dog and restores the parts which are connected to the levers 240 and 241 to the condition shown in Fig. 15.

When released by the lever 241, the drum moves to a fresh position where it controls the beats which are sent out to correspond to the position of the next digit-setting wheel. If a digit has been set up from each of the four groups of digit keys, then, after the digit designated by group A has been transmitted and the interval provided by the stop lever 241 has followed, the drum will next be brought to rest by the stop lever 240$^b$ of the next or B group of digits, and a number of beats will be transmitted corresponding to the digit which has been selected from that group. The drum will then move into the control of the interval stop lever 241$^b$ and then into the control of the next transmission stop lever 240$^c$ and so on, passing through the control of the several digit-setting wheels in succession until the entire signal has been transmitted.

If, however, there is any group a digit-setting key of which has not been pressed, so that its digit-setting wheel still remains in its zero position, then the two levers 240 and 241 corresponding to that group are held away from the drum 215 by the stop pins 205 and 206 belonging to its digit-setting wheel and are prevented from entering their stop notches, so that the drum when released will move until brought to rest by the stop lever 240 corresponding to the next digit wheel which has been set up, the transmitter skipping the digit belonging to the group where no key has been pressed.

Since the apparatus may be set to signals which omit digits from one or more of the groups, and the controlling drum is caused to move through a greater angular distance in some cases than in others, some of the stop fingers are made wider than others in order better to stop the drum when moving under its increased momentum. Thus, if none of the digit-setting keys on group C have been set, the drum when released by the finger 241$^b$ will jump directly to the position where it is stopped by the finger 240$^d$ which is made of extra width to receive the impact of the drum.

When the beats have been transmitted which correspond to the last digit of the signal set up, and the idle revolution of the controller drum has been provided for by the control of the interval finger 241, one round of the complete signal has been transmitted and the drum, when released by the finger 241, is brought to rest by the finger 270 which enters the notch 271, the finger 270 being adjacent the initial stop finger 230 and similarly fulcrumed on the shaft 231.

The finger 270 has a rearwardly extending end 272 which lies within the path of a finger 273 (see Fig. 8) secured to the shaft 164, which finger is so disposed that on the next revolution of the actuator shaft it strikes the depressed end 272 of the finger 270, lifts the latter and releases the drum 215 which is then brought to rest by the finger 230 in the position shown in Fig. 8.

Subject to the control of the rounds-setting mechanism which is hereinafter described, the apparatus continues to operate and the actuator shaft to rotate, and a second signal or round is thereupon transmitted in the manner already described, the successive rounds continuing to be transmitted until the apparatus is automatically brought to rest by the predetermined setting of the rounds mechanism. It will be seen, however, that the provision of the successive stop levers for the controller drum in connection with the cooperating mechanism provides the required intervals between successive digits of the same signal and between successive rounds. Between successive beats of the same digit an interval elapses corresponding to one rotation of the actuator shaft. Between the last beat of one digit and the first beat of the next succeeding digit in the same signal, an interval elapses corresponding to two rotations of the actuator shaft, these being required for shifting the control from the transmitting stop lever 240 of one group through the intermediate interval lever 241 and to the succeeding transmitting lever 240 of the next group. Between successive rounds, that is to say, between the last beat of the last digit of one round, and the first beat of the first digit of the next succeeding round, an interval elapses corresponding to four revolutions of the actuator shaft, these being required for moving the controlling drum first to the position determined by the next interval lever 241, thence to the position determined by the rounds stop finger 270, thence to the position determined by the holding finger 230, and finally to the position determined by the first transmitting finger 240.

Referring now to the mechanism for initiating the operation of the transmitter and automatically stopping the same, the same is herein associated with a setting device whereby the apparatus, after having been set to transmit any given digit or digit combination, as described, may be also set to predetermine the number of rounds of such signal as shall be transmitted; and, when so set for the number of rounds, the transmitter automatically starts into operation and continues in operation until the described number of rounds have been transmitted, when it automatically comes to rest.

For this purpose, there is provided on the faceplate of the machine (Figs. 1 and 8) a rounds-setting wheel or button 280 fixed on the short shaft 281 (Fig. 5$^b$) carrying a dial 282 bearing numerals corresponding to the number of rounds, which numerals, together with the zero designation, can be brought successively into view through the transparent panel 283 in the face-plate and indicate the position to which the rounds-setting device has been placed. Secured to the shaft 281 on the opposite side of the face-plate, there is provided a disc 284 which turns with the rounds-setting button.

To prevent the rounds-setting device from being moved and the operation of the transmitter initiated except when the transmitter has been set to some digit combination, the indicator wheels 70, 71, 72 and 73 serve to lock up the rounds-setting device so long as they remain in their zero position. For this purpose (Figs. 5 and 8) the disc 284 carries a laterally projecting pin 285 which is brought to rest against the lower end of a release lever 286 pivoted on the shaft 287, which release lever prevents movement of the disc 284 in the direction of the arrow shown in Fig. 5, except when the digit key of one or more of the groups has been pressed. The shaft 287 also has secured thereto four dogs 288, each having a toothed head 289 adapted to seat in a notch 290 in the disc 291, one such notched disc being secured to each indicator wheel to turn freely therewith on the shaft 74 and bringing the notch into registration with the toothed head 289 when its particular indicator wheel is at the zero position. The dogs are normally pressed toward the notches discs by a spring 292 on the shaft 287 and, when all four toothed heads are seated in their respective notches, the rounds-setting mechanism is locked against movement. When any digit key of any group is pressed and its indicator wheel moved to a position other than the zero position, the dog is forced outwardly by the notched disc, turning the shaft 287 and swinging the lower end of the lever 286 out of the path of the pin 285, thus releasing the rounds-setting mechanism. As soon as the digit-setting wheels are reset to bring all four indicator wheels back to the zero position, the rounds-setting device is again automatically locked up.

The rounds-setting shaft carries a drum 295 between the disc 284 and the face-plate and is normally turned right-handedly, as viewed in Figs. 5 and 6, by means of a coiled spring 296, one end of which is secured to the drum, and the other to a pin 297 fixed on the face-plate (Fig. 5b). The spring normally holds the drum in its zero position by holding a projecting shoulder 298 thereon against a pin 299 fixed in the face-plate. If the rounds-setting shaft is turned against the spring and in the direction of the arrow (see Fig. 5), the shouldered projection 298 is withdrawn from the stop pin 299, and as it is moved from each successive position corresponding to 1, 2, 3, etc. rounds, it is held in each successive position against return movement by means of a pawl 300 pivotally mounted at 301 on the pawl lever 302, the pawl being normally drawn by a spring 303 against a small stop pin 304 fixed on the face of the pawl lever.

As the rounds-setting shaft and drums are turned from the zero position shown in Fig. 6, to some higher position (as, for example, the three-rounds position shown in Fig. 7), the pawl is caused to snap over and back of successive teeth 305 projecting from the face of the disc 295, there being provided one tooth for each rounds position, and the end of the pawl and cooperating face of each tooth being so shaped as to hold the drum in any rounds position to which it may be moved by engagement of the pawl with the back of the tooth.

Referring now to the mechanism for automatically starting the transmitter into operation, while a separate starting device might be employed, the operating mechanism is herein connected to be started directly by the rounds-setting mechanism. For this purpose the starting lever 179 already referred to as controlling the starting brake 173, is pivoted on the shaft 128 and has a slotted or forked extension 310 (Figs. 11 and 17) engaging with a pin 311, the latter carried by one end 312 of a lever which is mounted to turn loosely on the shaft 231 and has an oppositely directed arm 314, the tip of which just back of the face-plate underlies one end of a lever 315 (see Fig. 5) which is fulcrumed at 316 and has the arm 317 at the opposite side of the fulcrum. The arm 317 overlies the end of a lever 318 which is also pivoted upon the shaft 231 and has a prolongation 319, the dog-shaped tip 320 of which is adapted to register with an opening 321 in the underside of the controlling drum 215 (Fig. 11) when the latter is held in a position of rest by the stop lever 230. The forward end of the lever 318 rests upon the edge of the rounds-setting disc 284, and the latter is provided with a notched portion 322 into which the end of the lever 318 is depressed by the tension spring 323 which is connected to the starting lever 314 and acts upon the lever 318 through the intermediate double-armed lever 315—317.

In the zero position of the rounds-setting device the parts are as indicated in Figs. 5 and 11, the lever 318 being depressed into the notch 322 on the disc 284 and the lever 314 being drawn up by the spring 323 so as to depress the pin 311 on the opposite end of that lever, this serving to hold up the starting lever 179 and raise the brake shoe 173, holding the fan shaft 167 fixed.

When the rounds-setting shaft is turned left-handedly (as viewed in Fig. 5) to bring one or more of the teeth 305 past the locking pawl 300, the end of the lever 318 is moved up out of the notched portion 322 and is engaged by the edge of the disc, raising the end 317 of the equal-armed lever, depressing the opposite end thereof and throwing down the end of the lever 314. This results in raising the pin 311 and depressing the opposite end of the starting lever 179, releasing the fan shaft from its brake and allowing the driving mechanism of the transmitter to start into instant operation. At the same time, the dog 320 at the end of the lever 319 is lifted from the notch 321 in the face of the controlling drum 215, and as soon as the drum is shifted from its starting position, the tip 320 of the lever is pressed outward and downwardly by the surface of the drum and the opposite end 318 of that lever positively held elevated until the controlling drum has completed one full revolution corresponding to one complete round. Accordingly, if the rounds-setting device has been set for one or more rounds, and the operation of the transmitter then initiated, the lever 318 is held out of the notch 322 and cannot drop into the same, whatever be the position of the disc 284, until the controlling drum 215 has made one complete revolution; and the device when once started must, therefore, send at least one complete round.

To insure that the circuit-controlling drum 132 will always start from and stop in substantially the same position and in a position where the contact lifters are in a lowered or ineffective position, the lever 312 is forked (Fig. 17) so that it also presents a rearwardly extending lever arm 325, the end of which carries a tooth 326 (Fig. 11) engaging the edge of a disc 327 secured to the end of the controlling drum and having a notched or depressed portion 328 in its periphery. When the starting lever 179 is depressed by the mechanism described, the lever 325 is raised from the notch 328. After the apparatus is set into operation, the starting lever cannot again be raised to stop the fan shaft until the contact controlling drum has turned to such position as to bring the notch 328 beneath the end 326 of the lever 325. It will, therefore, be seen that after the transmitter has been set into operation its subsequent stoppage is conditioned not only on the return of the rounds-setting disc to its zero position, but also on the completion of a round as determined by the engagement of the lever end 320 with the notch 321 of the controlling drum, and finally on the movement of the contact controlling drum to its prescribed initial or starting position.

At the end of each complete round the rounds-setting shaft is automatically set back one step, this being brought about by a rounds-controlling lever arm 330 (Fig. 11) mounted to swing on the shaft 231 and having the toothed end 331 which rests against the controlling drum 215 and is adapted to enter a notch 332 therein just after the completion of a round and before the drum is brought to rest by the stop lever 230. The shape of the head 331 on the rounds lever and the walls of the notch are such that as the controlling drum is released by the interval lever 241 and as it moves to the position where it is brought to rest by the rounds interval lever 270, it causes the lever 330 to move first into and then out of the notch 332, causing the opposite end 333 of the lever 330 to move quickly up and then down.

The end 333 of the rounds-controlling lever (Fig. 5 and 5ᵃ) underlies a shouldered head 334 carried by the upright rod 335 which is guided by a fixed guide 336, the lower end of the rod being jointed to the end of the pawl-carrying lever 302 which is pivoted upon the frame at 337. The opposite end of the pawl-carrying lever 302 has a jointed connection to the upright rod 338 which is provided with a slot 339 (Fig. 7) embracing the rounds-setting shaft 281, the slot being of sufficient length to permit a limited up and down oscillation of the pawl lever. The rod 338 is prolonged above the shaft 281 and has a headed pin 340 (Fig. 1) which projects through a slot in the faceplate, by means of which pin the rod may be moved up and down and the pawl lever oscillated for the purpose of manually resetting the rounds mechanism to a lower step at any desired time.

After a signal has been given and the round has been completed, the rounds lever 330 is automatically given the quick movement described which causes the momentary lifting of the pawl-actuating rod 335, the lifting spring 323 for the lever 333 being somewhat stronger than the relatively weaker spring 342 which normally holds the pawl-carrying lever in the position indicated in Figs. 6 and 7. This momentary oscillation of the pawl-lifting lever allows the rounds-setting shaft to turn back one step through the constantly applied turning effort of the coil spring 296, the action being as follows: Starting with the position represented in Fig. 7, as soon as the pawl-carrying lever is depressed to a point where the tip of the pawl passes below the contact edge of the engaged tooth 305, the drum is allowed to turn slightly left-handedly to bring the edge of the tooth against the face of the stop 304 also carried by the pawl lever but set back a trifle from the tip of the pawl. On the upward return swing of the pawl lever, the edge of the pawl is held by the lower beveled face of the tooth so that the latter becomes released as soon as the stop pin 304 moves up far enough to pass off the face of the tooth.

The tooth then slips past the stop pin, and the rounds-setting disc turns back, the pawl passing up the beveled lower face of the tooth and moving into position to engage the next succeeding tooth 305 and bringing the rounds-setting shaft to rest by engagement therewith.

At the end of each round, therefore, the pawl-carrying lever being momentarily depressed, the rounds-setting device is moved back one step and the indicator wheel shows the number of required rounds which the transmitter is set to deliver.

When the last round is being delivered, the indicator shows the numeral 1 and the next succeeding movement of the rounds lever, which follows the completion of the round, will allow the rounds drum to move to the zero position shown in Fig. 6, and the disc 284 to the position shown in Fig. 5, but the dropping of the lever 318 at the notch 322 will not cause the stoppage of the machine until both the controller drum and the contact controller drum have moved to the position which permits the lever 314 to lift into the position shown in Fig. 5.

At any time during the operation of the machine, the rounds-setting mechanism may be reset to a higher number by turning the knob 280, or may be reset to a lower number by depressing for the required number of times the resetting pin 340, the indicator, of course, changing to show the number of rounds to which the mechanism has been reset. In any case, however, the transmitter will continue in operation until that particular round then being transmitted is completed. That is to say, if the rounds-setting mechanism is initially set for three rounds and during the transmission of the first round is set back to two rounds, it will complete the first round and then automatically continue and deliver the second round before coming to rest. If it is initially set for three rounds and while delivering the first round is reset either to one round or to the zero position, it will come to rest after the delivery of the first round.

Preferably, the apparatus is provided with means whereby the operation of the transmitter having been once initiated by the movement of the fan shaft, the digit-setting wheels are locked and remain locked until the rounds-setting shaft reaches its zero position and the last signal is completed, so that a signal having once been started cannot be tampered with by resetting the numbered keys. For this purpose, the rounds-setting shaft 281 carries a second disc 350 against the edge of which bears a pin 351 (Fig. 5) carried by the lever 352 fulcrumed on the frame 353 and jointed at its end to the upright link 116 (see Fig. 8) which has been already described and is connected to the locking cradle 115. As soon as the rounds-setting mechanism is turned, therefore, the locking fingers are locked in position and remain locked until the signal has been completed and until the rounds-setting shaft again reaches its zero position.

It is sometimes desirable to permit the transmitter to operate and the various parts to function and go through their designed movements without, however, affecting the transmitting circuits and without the transmission of signals, this for test or exhibition purposes. For this purpose, the apparatus is provided with means whereby it may be so set as to permit the mechanisms to function down as far as the contact making and breaking devices, while leaving undisturbed the contacts which control the distribution circuits. This mechanism is controlled by a short pointer or arm 360 (Fig. 1) mounted on the face-plate and connected to a shaft 361. The pointer may be moved to either one of two positions marked "on" and "off" respectively. When the pointer is in the "on" position it turns a cam 362 (Fig. 5) on the back of the face-plate to the position there shown, and the apparatus is operative for the transmission of signals to the various distribution circuits, as heretofore explained. When it is turned to the "off" position, however, it causes a portion 363 of the cam having a larger radius to move over the end of a lever 364 and depress the same. This lever (see Figs. 8 and 17) is fixed to the shaft 231 and serves to move a pair of rearwardly extending arms 365 (one of which is shown in Fig. 11 and the other in Fig. 9), which arms underlie the two ends of the shaft 126 which supports the lifter arms 125. The movement of the cam 363 serves to lift the shaft 126, withdrawing the lifter arms to the dotted line position shown in Fig. 9, where they are out of range of engagement with the contact fingers 120 and ineffective for controlling the circuit. They are held in that position so long as the pointer 360 remains in the "off" position, and during that time the machine may function as described, but the movement of the contact-controlling drum 132 has no effect in disturbing the transmitting circuits or in transmitting impulses. Each arm 127 carries at its end a pin 366 working in the slot of a slotted arm 367, the latter pivoted on the fixed stud 143 and serving to limit the movement of the contact-carrying arms 127.

If it is desired at any time to transmit a signal represented by more than nine consecutive beats, this may be accomplished, up to within certain limits, by manipulation of the keys in group D controlling the digit-setting wheel 34. By means of these keys the apparatus may be set to transmit any number of consecutive impulses from one to eighteen inclusive. Obviously, this attachment, which may be useful for many purposes, such for example as "tolling," may be extended to include the transmission of signals of a higher range than those represented by the numeral 18. It will be observed that the meaning of the term "digit" as herein employed is not restricted to the narrow significance of an integer less than ten, but is inclusive of the meaning common in the art where it is often employed to designate the integer component of a numerical code signal irrespective of whether the integer has a value equal to or greater than ten.

The operation of the apparatus will be readily understood from an explanation of the functions of the several mechanisms which have been described. By pressing one key from each of the four groups, the apparatus can be set up to transmit any number up to and including 9,999. The keys may be pressed simultaneously, separately or in any desired order. If an error has been made in manipulating the keys (which would be readily ascertained by reference to the indicator), the mistake can be instantly rectified by pressing the right key or keys. Thus, if the apparatus is set up to the number 2,364, it can be immediately reset to 2,354 by pressing the number 5 key in the tens or C group. The signal having been set up, the rounds-turning button is moved to determine the number of rounds to be transmitted, and as soon as turned the apparatus starts into operation, transmitting the predetermined signal. Until at least one key has been pressed, the rounds-determining shaft cannot be moved and when once moved to determine the number of rounds, the digit-setting keys are locked up against movement until transmission of the predetermined signal has been completed. At any time during the transmission of the signal the rounds-setting mechanism can be moved to increase the number of rounds by turning the rounds-setting button 280, or to diminish the number of rounds by depressing the resetting pin 340. Whatever manipulation is given the latter, however, the apparatus will complete the sending of at least one round and continue to operate until the controlling drum 215 has finished its cycle of movement and the circuit-controlling cylinder has reached its normal or initial position.

It will be understood that the term "zero position" is employed as a convenient designation for the position which the number-setting wheels or any of them may occupy when they are incapable of transmitting a signal corresponding to the particular group represented by each, the specific form of apparatus shown not being intended to transmit any signal corresponding to zero.

It will be observed that the digit-setting keys have each a digit-setting movement of equal extent and similar character and direction, so that the operator, by manipulation through his fingers, can not only set up simultaneously two digits from different groups without mental confusion, but by simultaneously engaging separate keys from different groups with separate fingers of the same hand can simultaneously set up three or more digits, thus enabling him to set the apparatus for the transmission of any given signal instantly by a single movement.

While I have herein shown for purposes of illustration one specific embodiment of the invention including in combination many features of improvement over devices of this class and while I have herein disclosed its embodiment in an apparatus intended for one specific purpose, it is to be understood that the invention is neither limited in its application to the precise use herein described nor is it limited to the mechanical details herein disclosed or to the form or relative arrangement of parts. It will also be understood that many of the features of improvement herein described may be usefully employed individually or in combinations other than that herein shown and that extensive deviations may be made from the specific construction herein described without departing from the spirit of the invention.

Claims:

1. In an apparatus for formulating signals represented by digits or groups of integers and transmitting such signals with one or more repetitions, the combination with independently movable digit-setting means, one to correspond to each group, of individually movable and manually operable setting devices, one for each integer of each group, the actuation of any setting device conditioning its associated setting means for the formulation of the integer represented by the setting device so actuated, signal transmitting means, controlling means therefor governed by the conditioning of the setting means to control the transmitting means for the transmission of the signal represented by the actuated setting device, devices to adjust the apparatus to automatically repeat the signal a predetermined number of times, and starting mechanism to set the transmitting means into operation, said controlling means including devices to introduce a pause between the transmission of successive digits and a longer pause between successive repetitions.

2. An apparatus for formulating signals represented by digits or groups of integers, the same having a plurality of relatively movable digit setting means, a group of individual setting devices for each digit setting means, there being one such device for each integer of the group, connections between each setting device and its digit setting means, operable by the actuation of said setting device, to condition the setting means in a characteristic position corresponding to the integer represented by the associated device, and code signal transmitting mechanism governed by the relative positions of the digit setting means imparted by the individual setting devices.

3. An apparatus for formulating numerical code signals, the same having setting mechanism for a group of integers, individual setting devices, one for each integer of said group, each of said devices comprising a push key, mechanical connections between the push keys and the setting mechanism the manipulation of which sets the mechanism for the corresponding integer, and means governed by said mechanism for electrically transmitting a code-signal through impulses corresponding to the integer characterizing the push key manipulated.

4. An apparatus for formulating numerical code signals, the same having a plurality of setting wheels independently movable each to a plurality of different positions, a group of individually movable setting devices for each wheel adapted each when actuated to condition its setting wheel in a position characteristic of the particular setting device actuated, and means governed by the position of said setting wheels to formulate a code signal in an electric circuit.

5. An apparatus for formulating and transmitting signals represented by digits or groups of integers, the same having code-signal transmitting means, a plurality of setting mechanisms, one for each group of integers, movable to different relative positions corresponding to the respective integers selected, said mechanisms governing the transmitting means, a group of individually movable setting devices for each setting mechanism, one for each integer of each group, the actuation of which sets its associated setting mechanism.

6. An apparatus for formulating numerical code signals and transmitting the same, said apparatus having setting means movable to different positions corresponding to different integers of a group, a group of individually operable setting devices operatively related to said setting means, there being one such device for each integer of the group, the actuation of any setting device conditioning the setting means in a position corresponding to the integer represented by the setting device so actuated, and code-signal transmitting means controlled by the set position of the setting means to transmit the signal corresponding to such position.

7. In an apparatus for formulating signals represented by digits or groups of integers and transmitting such signals, the combination with independently movable digit-setting means, one for each group, of sets of individually movable setting devices, one set for each setting means, operative connections between said individually movable devices and their associated means whereby the actuation of any device conditions its associated setting means for the formulation of the integer represented by the setting device so actuated, signal transmitting means, controlling means therefor governed by the conditioning of the setting means to cause the transmission of the formulated signal, said controlling means including devices to introduce a pause between the transmission of successive digits of the combination.

8. An apparatus for formulating number signals represented by integers, the same having signal transmitting devices for controlling the transmission of code signals by current impulses through one or more electric circuits, a setting member for a group of integers movable to different positions, the position of said member governing the transmission of signals by said signal-transmitting devices, and a plurality of individually movable digit keys operatively related to the same setting member, one representing each integer of the group, and connections whereby the actuation of any key locates the setting device in a position determining the transmission of the corresponding integer signal.

9. An apparatus for formulating signals represented by digits or groups of integers and transmitting such signals, the same having independently movable digit-setting means, one for each group, transmitting devices governed by the conditioning of said digit-setting means for transmitting the formulated code signal by current impulses through an electric circuit, sets of individually movable setting keys, a set for each group and a key for each integer of each group, and means actuated by any key for conditioning its associated setting means for the formulation of the integer signal represented by the key so actuated.

10. An apparatus for formulating numerical code signals and transmitting the same, said apparatus having setting means movable to different positions corresponding to different integers of a group, a group of individually movable, manually operable and similar setting devices, one for each integer of the group, said devices being operated by manual movement of like extent, means operated by the actuation of any setting device for conditioning the corresponding setting means for the formulation of the integer signal represented by the setting device so actuated, and means controlled by the setting means for electrically transmitting the signal set by the setting device or devices.

11. An apparatus for formulating signals represented by digits or groups of integers and for transmitting such signals, the same having signal-transmitting means and governing mechanism therefor, the latter including a plurality of digit-setting wheels, one for each group of integers, the position of each wheel determining the integer transmitted from its group, means for constantly and independently urging each wheel to turn in a given direction, setting devices to provide for the holding of a wheel in a given integer-determining position but permitting its release and rapid movement to a different integer-determining position, said devices including a plurality of differently positioned stop elements or teeth circumferentially and longitudinally distributed on each wheel, a stop lever with a stop finger corresponding to each tooth and adapted to be thrown into the path of the same to engage the tooth and hold the wheel positioned thereby, an individual setting key to actuate each lever, locking means comprising an individual latching device automatically to hold each stop lever in its effective stop position when moved thereto, and unlatching means comprising a member operatively related to each of the latching devices of any one group and adapted to be moved by the actuation of any given key to unlatch the stop lever already in stop position, thereby releasing the wheel and permitting it to move to a stop position determined by the lever last actuated.

12. An apparatus for formulating signals represented by digits or groups of integers and for transmitting such signals, the same having signal-transmitting means and governing mechanism therefor, the latter including a plurality of digit-setting members, one for each group of integers, the position of each member determining the integer transmitted from its group, means for constantly and independently urging each setting member to move in a given direction, setting devices to provide for the holding of a setting member in a given integer-determining position but permitting its release and rapid movement to a different predetermined position, said devices including a plurality of differently positioned stop elements on each setting member and a cooperating stop member for each stop element adapted to be moved to engage the latter and hold the setting member positioned thereby, and an individual setting device to actuate each stop device, there being also provided means controlled by the actuation of any given setting device to withdraw the stop device already in stop position, thereby releasing the digit-settting member and permitting it to move to a stop position determined by the setting device last actuated.

13. An apparatus for formulating signals represented by digits or groups of integers and for transmitting such signals, the same having signal-transmitting means and governing mechanism therefor, the latter including a plurality of digit-setting wheels, one for each group of integers, the position of each wheel determining the integer transmitted from its group, means for constantly and independently urging each wheel to turn in a given direction, and setting mechanism to provide for the holding of a wheel in a given integer-determining position but permitting its release and rapid movement to a different integer-determining position.

14. An apparatus for formulating signals represented by a combination of integers and for transmitting such signals, the same having signal-transmitting means and governing mechanism therefor, the latter including a plurality of setting wheels, one for each group of integers, the position of each wheel determining the integer transmitted from its group, means for constantly and independently urging each wheel to turn in a given direction, and setting mechanism to provide for the holding of a wheel in a given integer-determining position, said mechanism also including individual number-setting keys, one for each integer-determining position of each wheel.

15. An apparatus for formulating signals represented by a combination of integers and for transmitting such signals, the same having signal-transmitting means and governing mechanism therefor, the latter including a plurality of setting members, one for each group of integers, means adapted to turn each member constantly and independently in a given direction, the position of each member determining the integer transmitted from its group, a set of individual integer setting devices for each setting member, and means between the setting devices and setting members providing, through the actuation of a setting device, for the release of a setting member and its movement to a stop position determined by the identity of the setting device last actuated.

16. An apparatus for formulating signals composed of integers and for transmitting such signals, the same having signal-transmitting means for electrically transmitting a code signal and governing mechanism therefor, the latter including a rotatable setting member, the position of which determines the integer transmitted, a plurality of movable stop devices, one for each of the number-determining positions of said member, to retain the same in such respective position during the transmission of the signal, and means for separately actuating said stop devices.

17. An apparatus for formulating integer signals, the same having integer setting mechanism, the latter including a rotatable setting member with impelling means to urge the same constantly to turn in a given direction, a series of independently operable stop devices adapted to stop and hold the said member in any one of a plurality of different integer-determining positions while the signal is transmitted, manual means to actuate said stop devices, and means governed by the position of said setting member for electrically transmitting a code signal.

18. An apparatus for formulating signals represented by digits or groups of integers and for transmitting such signals, the same having signal-transmitting means and governing mechanism therefor, the latter including a plurality of digit-setting members with means constantly urging said members to turn each in a given direction and independently of each other, and a plurality of individually movable, manually controlled devices related to each setting member, adapted each when actuated to release and then stop its related setting member in one of a plurality of integer-determining positions characteristic of the member so actuated.

19. An apparatus for formulating numerical code signals and for transmitting such signals, the same having signal-transmitting means for electrically transmitting a code signal and governing mechanism therefor, the latter including an integer-setting member with means for urging the same to move in a given direction and a plurality of individually movable setting devices adapted each when actuated to position the member in an integer-determining position characteristic of the setting device so actuated and there to hold the same while the signal is transmitted.

20. An apparatus for formulating signals represented by integers and for transmitting such signals, the same having signal-transmitting means and governing mechanism therefor, the latter including an integer-setting member, a plurality of individually operable setting devices operatively related to said member, and means operated by the actuation of any setting device for positioning said member in a position represented by the device so actuated and determining the integer for which the mechanism is set, and interlocking mechanism to hold a setting device in its integer-setting position until the actuation of another integer-setting device.

21. An apparatus for formulating code signals respectively characterized by distinctive integers and for transmitting such signals, the same having signal-transmitting means and governing mechanism therefor, the latter including a setting member rotatable always in the same direction and arranged so that certain predetermined positionings thereof will cause formulation of signals representative of certain predetermined integers, respectively, the position of which determines the signal transmitted, individually movable setting devices arranged for causing the setting member to assume one or another of such positions, one for each integer, and interlocking mechanism therefor.

22. An apparatus for determining and transmitting numerical code signals characterized by distinctive numbers of impulses, comprising a setting mechanism having individually movable number setting devices, one for each number of impulses to be transmitted, starting means, mechanism responsive to the actuation of said devices to automatically hold said devices when one is moved to set the mechanism, transmitting means controlled by said setting devices for transmitting impulses corresponding in number to the device moved, and mechanism for releasing the set device operable by the setting of another device prior to the operation of said starting means.

23. An apparatus for formulating signals represented by digits or groups of integers and transmitting such signals, the same having setting mechanism including digit setting members, one for each digit, and adjustable to different relative positions to formulate the signals, a plurality of setting devices for each setting member, said devices being separately operable and there being one for each integer of the group, mechanism automatically to hold said setting device when actuated, mechanism actuated by the operation of a subsequent setting device to release said holding mechanism, and mechanism governed by said setting devices for electrically transmitting a code signal.

24. An apparatus for formulating signals represented by digits or groups of integers and for transmitting such signals, the same having transmitting means and governing mechanism therefor, the latter including a plurality of digit setting members, one for each group of integers, the position of each member determining the integer formulated from each group, means for constantly and independently urging each member to move in a given direction, setting devices to provide for the positioning of a member in a given integer-determining position but permitting its release and quick movement to a different integer-determining position, such setting devices including a plurality of stop members adapted to be independently moved each to stop the setting member in different position, an individually movable setting device for actuating each stop member, latching means automatically to hold each stop member in its effective stop position when moved thereto, and unlatching means adapted to be moved by the actuation of any given setting device to unlatch the stop member already in stop position, thereby releasing the setting member and permitting it to move to a stop position determined by the stop device last actuated.

25. An apparatus for formulating signals represented by different integers and for transmitting such signals, the same having transmitting means and governing mechanism therefor, the latter including a movable integer setting member, its position determining the integer formulated, means for constantly urging said member to move in a given direction, setting devices to provide for the positioning of said member in a given integer-determining position but providing for its quick movement to a different integer-determining position, such setting devices including a plurality of positioning members adapted to be independently moved each to position the setting member in a different position, and an independently movable setting device for actuating each positioning member, there being also provided means to control the actuation of any given setting device to disengage the previously moved positioning device from the setting member, thereby releasing the same and permitting it to move to a position determined by the setting device last actuated.

26. An apparatus for formulating signals represented by different integers and for transmitting such signals, the same having transmitting means and governing mechanism therefor, the latter including a movable integer setting member, its position determining the integer formulated, means for constantly urging said member to move in a given direction, setting devices to provide for the positioning of said member in a given integer-determining position but providing for its quick movement to a different integer-determining position, such setting devices including a plurality of positioning members adapted to be independently moved each to position the setting member in a different position, and an independently movable setting device for actuating each positioning member.

27. An apparatus for formulating signals represented by different integers of a group, the same having transmitting mechanism and governing mechanism therefor, the latter including a movable integer setting member, its position determining the integer formulated, independently movable setting devices to position the said member, one such device for each integer of the group, means whereby the actuation of any device releases the setting member from the position represented by the device previously actuated and repositions it in a position represented by the device last actuated.

28. An apparatus for formulating signals representative of digits or groups of integers and transmitting such signals, the same having code-signal transmitting means, digit-setting mechanism for each integer group arranged to cause such formulation of signals that time intervals between the portions of such signals representative of succeeding digits or integers of succeeding groups will be separated by time intervals of substantially uniform duration, independently movable setting devices, one for each integer of each group, and an independent clearing device for each integer group to reset the setting mechanism of that group to zero position.

29. An apparatus for formulating signals represented by digits or groups of integers and transmitting such signals, the same having code-signal transmitting means and governing mechanism, the latter including a rotatable digit setting member for each integer group, the position of which determines the integer transmitted, a plurality of independently movable setting devices, one for each integer of each group, means whereby the actuation of any one of said devices sets the rotatable member in a position represented by the device so actuated, and clearing means to restore any individual digit setting member to zero position independently of the others.

30. An apparatus for formulating and transmitting signals represented by members of a group of integers having an integer setting device, means for automatically impelling said device to move but permitting the latter to be normally held in a position determining the integer transmitted, actuating means for causing the impelling force to move said device from a position corresponding to any integer of the group to a position corresponding to any other integer of the group, and means controlled by said device for transmitting impulses variable in number and dependent on the final position only of said device during signal transmission.

31. An apparatus for formulating and transmitting numerical code signals representing integers selected from a group, the same having a rotatable setting device with means urging it to turn in a given direction, actuating means to cause the impelling force to move said device from a position corresponding to any integer of the group to a position corresponding to any other integer of the group, and means governed by the final position only of said device for formulating a code-signal in an electric circuit.

32. In an apparatus for formulating code signals represented by digits or groups of integers and transmitting such signals, the combination with transmitting means for formulating code-signals, the latter comprising impulses in an electric circuit variable as to number and arrangement for distinctively characterizing the selected integers, of governing mechanism including a digit-setting element for each group, a plurality of individually movable actuating devices for each integer of each group, means operated by any one of the actuating devices for positioning its associated setting element for the formulation of the integer represented by the setting device so operated.

33. An apparatus for formulating and transmitting numerical signals, the same having integer setting means, transmitting mechanism for formulating code signals comprising impulses of an electric circuit variable as to number for distinctively characterizing the selected integer, governing means including a rotatable controller for governing the effectiveness of said transmitting mechanism controlled by the previous setting of the integer setting means, and means to lock the setting means against being reset after the apparatus has started into operation.

34. An apparatus for formulating and transmitting signals representing integers, the same having transmitting mechanism for formulating code signals in an electric circuit, governing mechanism including integer setting mechanism, rounds-determining mechanism to determine the number of repetitions, and locking means between the integer setting mechanism and the rounds-determining mechanism to prevent the setting mechanism from being reset until the predetermined number of rounds has been completed.

35. An apparatus for formulating and transmitting signals representing integers, the same having integer-determining mechanism and rounds-determining mechanism, means for automatically locking said integer-determining mechanism against resetting while the machine is in operation and automatically unlocking the same at the termination of a round, and means governed by said integer-determining mechanism for formulating code signals in an electric circuit.

36. An apparatus for formulating signals representing digits or groups of integers and transmitting such signals with one or more repetitions, the said apparatus having independently movable digit-setting means, one to correspond to each group of integers, individually and manually operable setting devices for each integer of each group, rounds mechanism to adjust the apparatus to automatically repeat the signal a predetermined number of times, starting mechanism, and means to lock the digit-setting means against manual revision of the setting thereof after the machine has started into operation.

37. An apparatus for formulating and transmitting numerical code signals representing integers selected from a group, the same having transmitting mechanism for formulating code signals in an electric circuit, integer setting mechanism including a rotatable setting element for the group of integers governing the transmitting mechanism, individually and manually operable setting devices, one for each integer of the group, the actuation of any setting device conditioning its associated setting mechanism for the formulation of the integer represented by the device so actuated, starting mechanism, and means to lock the integer setting mechanism against manual revision of the setting thereof after the mechanism has started into operation.

38. An apparatus for formulating and transmitting number signals, the same having setting mechanism including a rotatable setting element, transmitting mechanism governed by said setting mechanism for formulating a code signal in an electric circuit, operating mechanism with starting devices, and means to lock the starting devices and operating mechanism to prevent operation until the setting mechanism has been set to transmit a signal.

39. An apparatus for formulating and transmitting signals represented by integers, the same having integer-setting mechanism, means for locking the apparatus against operation when the setting mechanism is in its zero position, transmitting mechanism for formulating a code signal in an electric circuit, and governing means including a rotatable controller for governing the effectiveness of said transmitting mechanism.

40. An apparatus for formulating signals representing an integer and for transmitting such signals with one or more repetitions, the same having setting mechanism, transmitting mechanism, rounds-determining mechanism to adjust the apparatus for the repetition of a predetermined number of signals, and means to lock the rounds-determining mechanism until the setting mechanism has been set to transmit a signal.

41. An apparatus for formulating and transmitting numerical code signals represented by different integers of a group, the same having transmitting mechanism, integer-setting mechanism and individually movable setting devices, one for each integer of the group, and means whereby the actuation of any device annuls the conditioning of the setting mechanism representative of the device previously actuated and effects conditioning of said setting mechanism for the formulation of the integer represented by the device last actuated.

42. An apparatus for formulating signals represented by digits or groups of integers and transmitting such signals with one or more repetitions, the same having signal-transmitting means including a circuit-controlling, signal-transmitting drum with means for imparting to the same a constant and uniform movement and cooperating, contact-controllers for controlling a plurality of circuits whereby said transmitting mechanism is adapted to transmit one beat or impulse for each cycle of movement of the transmitting drum, governing mechanism including digit-setting devices, an actuating device moved synchronously with the transmitting member and adapted to actuate the governing mechanism at each cycle of movement, and operative connections between the governing mechanism and the transmitting mechanism for throwing the contact-controlling devices out of operative relation to the circuit-controlling drum for one or more rotations of the latter, thereby to introduce suitable intervals or pauses between the successive digits and successive rounds while permitting the uninterrupted rotation of the drum.

43. An apparatus for formulating signals represented by digits or groups of integers and transmitting such signals with one or more repetitions, the same having signal-transmitting means including a signal-transmitting member with means for imparting to the same a constant and uniform movement and cooperating transmitting devices adapted to transmit through a plurality of circuits one beat or impulse for each cycle of movement of the transmitting member, governing mechanism for controlling the transmitting mechanism to introduce pauses or intervals between successive digits and successive rounds, and operative connections between the governing mechanism and the transmitting mechanism for rendering the transmitting member ineffective when such intervals or pauses are required, while permitting its uninterrupted movement.

44. An apparatus for formulating and transmitting signals transmitted in the form of regularly timed impulses or beats separated by suitable intervals to indicate combinations of integers and longer intervals to indicate rounds or repetitions of the same, the same having a circuit-controlling drum, governing mechanism including integer-setting devices and a signal controlling drum, the latter adapted to make one turn for each round transmitted, a rotatable actuating member for the governing mechanism, means for rotating such circuit-controlling drum and actuating member synchronously, once for each time interval corresponding to an impulse or beat, and operative connections between the governing mechanism and said circuit-controlling drum to render the latter ineffective during one or more rotations to provide suitable intervals or pauses.

45. In an apparatus for formulating and transmitting signals represented by integers, the combination with transmitting mechanism, of governing mechanism therefor, the latter including an integer setting device comprising a rotatable member having two parts, one yieldably connected to the other for independent movement during signal transmission, said device adapted to be set to any one of a plurality of positions and thereby determine the number of impulses transmitted to characterize the position of the integer setting device.

46. In an apparatus for formulating signals represented by integers, integer-setting mechanism including an integer-setting wheel having a normal or zero position, means for setting it to an integer-determining position, a part yieldably connected to the integer-setting part to move therewith when the integer-setting part is set, and devices to move the yieldably-connected part step by step with relation to the integer-setting part until the predetermined integer has been transmitted and to thereupon release the yieldably connected part to permit its restoration to the integer-determining position.

47. In an apparatus for formulating and transmitting signals represented by integers, the combination with transmitting means, of setting means including a rotary integer-setting element constantly urged to turn in a given direction and devices to set it to an integer-determining position, a second element having a zero position but movable with the rotary setting element to the integer-determining position, devices for moving the second element back to its zero position while the apparatus is in operation and leaving the setting element fixed, the range of return movement of said second element governing the integer signal transmitted.

48. In an apparatus for formulating and transmitting signals represented by digits or groups of integers, the combination with transmitting means, of digit-setting means including a rotary setting element constantly urged to turn in a given direction and devices to set it to an integer-determining position, a second element having a zero position but movable with the rotary setting element to the integer-determining position, devices for moving the second element back to its zero position while the apparatus is in operation and leaving the setting element fixed, the range of return movement of said second element governing the integer signal transmitted, and means for restoring the second element to its integer-determining position on the completion of the transmission of its own integer.

49. An apparatus for transmitting numerical code signals, the same having transmitting means for electrically transmitting impulses varying in number according to the number to be transmitted, governing mechanism therefor including setting means having a rotary setting element rotatable always in the same direction and adapted to be set in any one of a plurality of positions and thereby to determine the number of impulses to be transmitted, and means for accomplishing all settings thereof by movement in the same direction.

50. An apparatus for transmitting numerical code signals, the same having transmitting means for electrically transmitting impulses varying in number according to the number to be transmitted, governing mechanism therefor including a rotatable setting element rotatable always in the same direction and adapted to be set in any one of a plurality of positions and thereby to determine the number of impulses to be transmitted, and means for turning it always in the same direction for successive settings.

51. An apparatus for formulating and transmitting number signals, the same having transmitting means and governing mechanism therefor, the latter including number-determining mechanism with means for setting it in a predetermined position, pause mechanism, and a rotatable controller rotatable always in the same direction to cooperate with the pause mechanism and to control the successive steps in the transmission of any given signal.

52. In an apparatus for formulating and electrically transmitting impulses varying in number and arrangement for distinctively characterizing number signals, the combination of impulse transmitting mechanism, a plurality of setting devices each with mechanism for governing the number of successive impulses in some component of a number signal, a rotatable controller with means for consecutive response to said setting devices to render them effective in orderly sequence, and means for rotating said controller through one revolution in the transmission of any complete signal.

53. In an apparatus for formulating numerical code signals represented by digits or groups of integers and transmitting them in one or more rounds, the combination with a transmitting mechanism including a movable transmitting member, of a pause controller for governing the pause between successive integers and also between successive rounds, the said controller having a predetermined cycle of movement for each signal transmitted, pause mechanism responsive to said controller for governing the effectiveness of said transmitting member, integer-determining mechanism for governing said controller, and means for setting said mechanism, an actuator for said determining mechanism, and means for synchronously moving said actuator and transmitting member.

54. An apparatus for formulating and transmitting integer signals transmitted in the form of regularly timed impulses or beats separated by suitable intervals to indicate the integers and longer intervals to indicate rounds or repetitions, the same having transmitting mechanism and governing mechanism, the latter including an integer-determining device adapted to be moved one step for each impulse transmitted, and the number of impulses being determined by the range of movement of said device, a rotary controller adapted to be moved when said integer-determining device completes its predetermined movement, the latter being thereby restored to its integer-determining position, and pause mechanism governed by the movement of said controller.

55. In an apparatus for formulating and transmitting numerical code signals represented by groups of integers, the combination with transmitting means for transmitting such signals in the form of groups of electrical impulses varying in number, each group representing an integer and the groups being separated by pauses of greater duration than the pauses between the impulses of any one group, of setting devices with means for conditioning the same to formulate the desired integer combination, and governing mechanism through which said setting devices act on the transmitting mechanism, the same including a rotary controlling member, the cycle of movement of which is a complete rotation, the latter acting to govern by successive stoppages the several steps of the signal, including the transmitting period and the pause period between the successive integer components of the signal.

56. In an apparatus for formulating and transmitting signals represented by integers, the combination with transmitting mechanism, of governing mechanism including a setting element whose cycle of operation is a complete revolution and having positions each characteristic of an integer, means tending to progressively move said element always in the same direction, and independently operable devices each arranged for stopping said element in a position characteristic of the device operated.

57. An apparatus for formulating and transmitting signals represented by integers having transmitting mechanism and governing mechanism including an integer-determining, element adapted to be set in a plurality of different positions one for each integer, means tending progressively to move said element from one set position to another always in the same direction, a series of movable, stop devices one for each integer, and means to actuate each stop device to stop said element at the position corresponding to the stop device actuated.

In testimony whereof, I have signed my name to this specification.

NATHAN H. SUREN.